US012627426B2

(12) United States Patent
Lu et al.

(10) Patent No.: US 12,627,426 B2
(45) Date of Patent: May 12, 2026

(54) COMMUNICATION METHOD, AND MULTI-LINK DEVICE

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/274,648

(22) Filed: Jul. 21, 2025

(65) Prior Publication Data

US 2025/0350417 A1     Nov. 13, 2025

Related U.S. Application Data

(63) Continuation of application No. 18/747,566, filed on Jun. 19, 2024, which is a continuation of application No. PCT/CN2021/140608, filed on Dec. 22, 2021.

(51) Int. Cl.
| | |
|---|---|
| *H04L 5/00* | (2006.01) |
| *H04W 56/00* | (2009.01) |
| *H04W 76/15* | (2018.01) |

(52) U.S. Cl.
CPC ............ *H04L 5/0035* (2013.01); *H04L 5/001* (2013.01); *H04W 56/0015* (2013.01); *H04W 76/15* (2018.02)

(58) Field of Classification Search
CPC ...... H04L 5/0035; H04L 5/001; H04W 76/15; H04W 56/0015
See application file for complete search history.

(56) References Cited

U.S. PATENT DOCUMENTS

| | | | |
|---|---|---|---|
| 2004/0151109 A1* | 8/2004 | Batra .................... | H04L 1/0071 370/208 |
| 2020/0314920 A1* | 10/2020 | Seok ................. | H04W 74/0808 |

(Continued)

FOREIGN PATENT DOCUMENTS

| | | | |
|---|---|---|---|
| CN | 113068214 A | 7/2021 | |
| CN | 115777180 B | * 9/2025 | .......... H04W 74/006 |

OTHER PUBLICATIONS

"Operation with Non-STR AP" IEEE 802.11_20/755r1;May 15, 2020; Jinjing Jiang; Apple Inc.

(Continued)

*Primary Examiner* — Khai M Nguyen

(74) *Attorney, Agent, or Firm* — BAYES PLLC

(57) ABSTRACT

A communication method includes: providing, by a plurality of APs affiliated with a first MLD, a primary link and a nonprimary link, the first MLD being an AP MLD, the primary link being the link between a first AP affiliated with the first MLD and a first STA affiliated with a second MLD, and the nonprimary link being the link between a second AP affiliated with the first MLD and a second STA affiliated with the second MLD; and initiating, by the plurality of APs affiliated with the first MLD, data transmissions via the primary link and the nonprimary link based on synchronization of EDCA operations on the primary link and the nonprimary link.

20 Claims, 10 Drawing Sheets

(56) References Cited

U.S. PATENT DOCUMENTS

| | | | |
|---|---|---|---|
| 2021/0014811 A1* | 1/2021 | Seok | H04W 76/15 |
| 2021/0315025 A1 | 10/2021 | Seok et al. | |
| 2023/0054755 A1* | 2/2023 | Patil | H04W 76/15 |
| 2023/0164857 A1* | 5/2023 | Hwang | H04W 74/0866 |
| | | | 370/329 |
| 2024/0107606 A1* | 3/2024 | Du | H04W 74/08 |
| 2024/0214936 A1* | 6/2024 | Du | H04W 60/04 |
| 2024/0349377 A1* | 10/2024 | Ambede | H04W 28/0967 |

OTHER PUBLICATIONS

"Draft Standard for Information technology—Telecommunications and information exchange between systems Local and metropolitan area networks—Specific requirements" IEEE P802.11be™ /D1.3; Nov. 2021.

International Search Report and Written Opinion of the International Searching Authority regarding International Patent Application No. PCT/CN2021/140608, dated Apr. 28, 2022.

* cited by examiner

Providing a primary link and a nonprimary link ～S210

Initiating data transmissions via the primary link and the nonprimary link based on synchronization of EDCA operations on the primary link and the nonprimary link ～S220

| Common Info Length | MLD MAC Address | Link ID Info | BSS Parameters Change Count | Medium Synchronization Delay Information | EML Capabilities | MLD Capabilities | PLNPL Capabilities |
|---|---|---|---|---|---|---|---|
| 1 | 6 | 0 or 1 | 0 or 1 | 0 or 2 | 0 or 2 | 0 or 2 | 0 or 1 |

Octets:

FIG. 8

COMMUNICATION METHOD, AND MULTI-LINK DEVICE

CROSS-REFERENCE TO RELATED APPLICATIONS

This application is a continuation of application Ser. No. 18/747,566 filed on Jun. 19, 2024, which is a continuation of International Application No. PCT/CN2021/140608 filed on Dec. 22, 2021, both of which are incorporated herein by reference in its entireties.

TECHNICAL FIELD

The present disclosure generally relates to the field of communication, in particular, to a communication method, a communication apparatus, a multi-link device, and a storage medium.

BACKGROUND

In IEEE 802.11be or Wi-Fi 7, a multi-link operation (MLO) is proposed to provide higher throughput, lower latency, and/or higher reliability.

It should be noticed that an access point (AP) multi-link device (MLD) may provide multiple access points (APs) operating on a pair of links. Also, a non-AP MLD may provide multiple stations (STAs) operating on a pair of links. In nonsimultaneous transmit and receive (NSTR), data transmissions of a pair of links may be initiated with the same start time if one link of the pair of links obtains transmission opportunity (TXOP). However, in some situations, a transmission may be delayed or may lose its TXOP in one link due to the synchronization mechanism between the pair of links.

SUMMARY

Exemplary embodiments of the disclosure provide a communication method, a communication apparatus, a multi-link device (MLD), and a storage medium, to resolve the synchronization problem between a pair of links.

According to one or more exemplary embodiments of the disclosure, a communication method is provided. The communication method includes, but is not limited to, the following steps. A primary link and a nonprimary link are provided by multiple access points (APs) affiliated with a first MLD. The first MLD is an access point (AP) MLD. The primary link is connected between a first AP affiliated with the first MLD and a first station (STA) affiliated with a second MLD. The nonprimary link is connected between a second AP affiliated with the first MLD and a second STA affiliated with the second MLD. Data transmissions are initiated by the first MLD via the primary link and the nonprimary link based on synchronization of enhanced distributed channel access (EDCA) operations on the primary link and the nonprimary link.

According to one or more exemplary embodiments of the disclosure, a communication method is provided. The communication method includes, but is not limited to, the following steps. A primary link and a nonprimary link are provided by multiple STAs of a second MLD. The second MLD is a non-AP MLD. The primary link is connected between a first AP affiliated with a first MLD and a first STA affiliated with the second MLD. The nonprimary link is connected between a second AP affiliated with the first MLD and a second STA affiliated with the second MLD. Data transmissions are initiated by the second MLD via the primary link and the nonprimary link based on synchronization of EDCA operations on the primary link and the nonprimary link.

According to one or more exemplary embodiments of the disclosure, a communication apparatus is provided. The communication apparatus includes a link providing module and a transmission initiating module. The link providing module is configured for providing a primary link and a nonprimary link. The primary link is connected between a first AP affiliated with a first MLD and a first STA affiliated with a second MLD. The nonprimary link is connected between a second AP affiliated with the first MLD and a second STA affiliated with the second MLD. The transmission initiating module is configured for initiating data transmission via the primary link and the nonprimary link based on synchronization of EDCA operations on the primary link and the nonprimary link.

According to one or more exemplary embodiments of the disclosure, an MLD is provided. The MLD includes a memory and a processor. The memory is configured to store instructions. The processor is coupled with the memory and configured to execute the instructions to cause the MLD to perform the aforementioned communication method.

According to one or more exemplary embodiments of the disclosure, a chip is provided. The chip is used to implement the aforementioned communication method.

According to one or more exemplary embodiments of the disclosure, a non-transitory computer-readable storage medium is provided. The non-transitory computer-readable storage medium stores a program code to cause a computer to perform the aforementioned communication method.

According to one or more exemplary embodiments of the disclosure, a computer program product is provided. The computer program product includes a computer program instruction that enables a computer to execute the aforementioned communication method.

According to one or more exemplary embodiments of the disclosure, a computer program is provided. When the computer program is run on a computer, the computer program enables the computer to execute the aforementioned communication method.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8 is a schematic diagram of information fields of multi-link element format according to an exemplary embodiment of the present disclosure.

DETAILED DESCRIPTION

Figure 1:
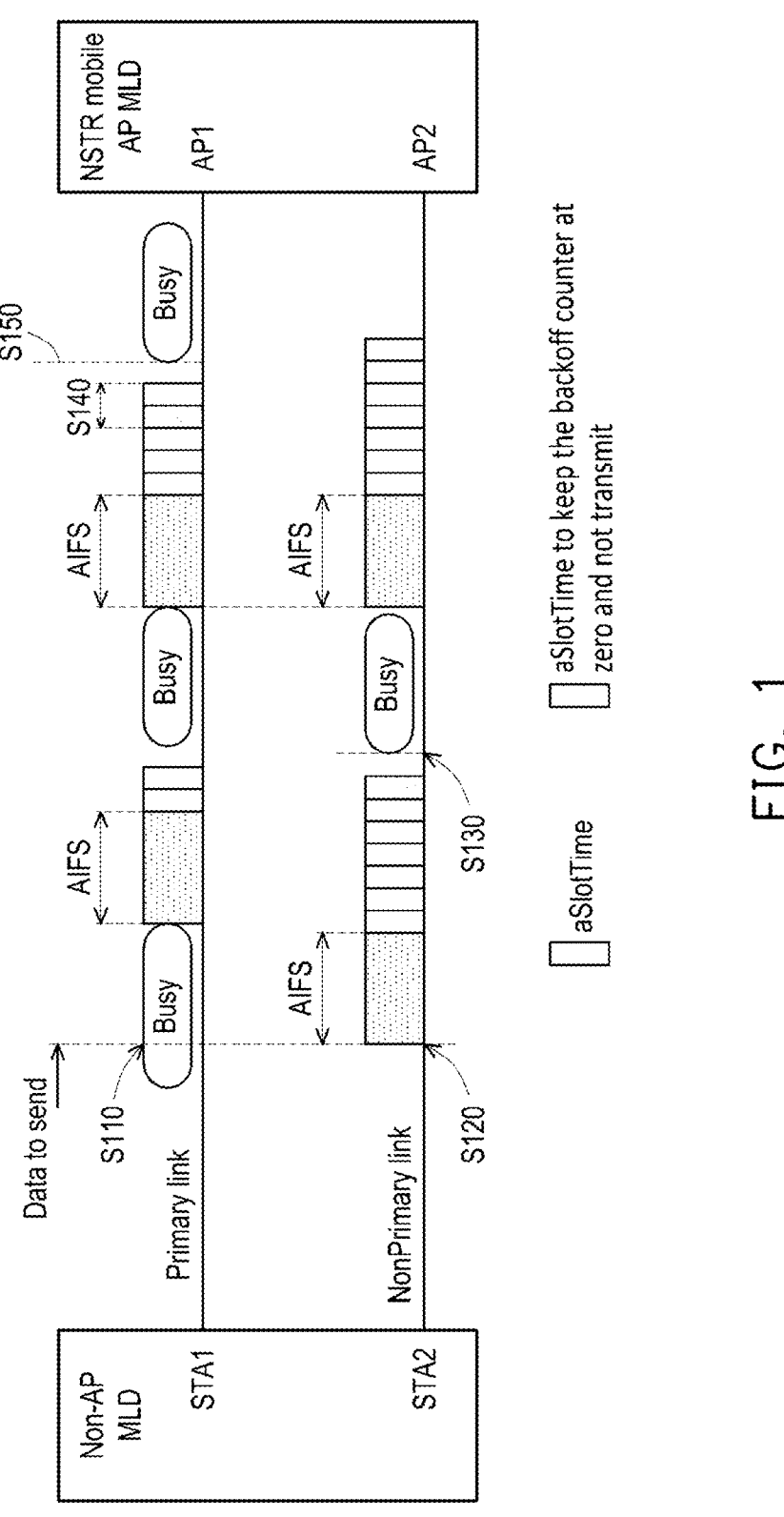
FIG. 1 is a schematic diagram of medium access operation according to an exemplary embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the embodiments, a communication method is provided, which includes:

providing, by a plurality of access points (APs) affiliated with a first multi-link device (MLD), a primary link and a nonprimary link, the first MLD being an access point (AP) MLD, the primary link being the link between a first AP affiliated with the first MLD and a first station (STA) affiliated with a second MLD, and the nonprimary link being the link between a second AP affiliated with the first MLD and a second STA affiliated with the second MLD; and initiating, by the plurality of APs affiliated with the first MLD, data transmissions via the primary link and the nonprimary link based on synchronization of enhanced distributed channel access (EDCA) operations on the primary link and the nonprimary link.

In some embodiments, the EDCA operations include backoff procedures, and initiating data transmission via the primary link and the nonprimary link based on synchronization of EDCA operations on the primary link and the nonprimary link includes:

synchronizing, by the plurality of APs affiliated with the first MLD, initiations of the backoff procedures of the primary link and the nonprimary link.

In some embodiments, synchronizing the initiations of the backoff procedures of the primary link and the nonprimary link includes:

invoking, by the second AP affiliated with the first MLD, the backoff procedure of the nonprimary link at the same time as invoking the backoff procedure of the primary link.

In some embodiments, synchronizing the initiations of the backoff procedures of the primary link and the nonprimary link includes:

setting, by the second AP affiliated with the first MLD, an interframe space (IFS) of the nonprimary link for the backoff procedure thereof as a value which is the same as an IFS used by the primary link for the backoff procedure thereof.

In some embodiments, synchronizing the initiations of the backoff procedures of the primary link and the nonprimary link includes:

setting, by the second AP affiliated with the first MLD, an initial backoff counter (BC) value of the nonprimary link for the backoff procedure thereof as a value that is equal to or less than an initial BC value of the primary link for the backoff procedure thereof.

In some embodiments, synchronizing the initiations of the backoff procedures of the primary link and the nonprimary link includes:

determining, by the second AP of the first MLD, a medium as idle for the backoff procedure of the nonprimary link when the medium is deemed idle as indicated by physical and virtual carrier sense (CS) mechanism on both primary link and the nonprimary link.

In some embodiments, synchronizing the initiations of the backoff procedures of the primary link and the nonprimary link includes:

resuming or restarting, by the second AP affiliated with the first MLD, the backoff procedure of the nonprimary link at the same time as resuming the backoff procedure for the primary link when a BC value of the nonprimary link is larger than a BC value of the primary link.

In some embodiments, synchronizing the initiations of the backoff procedures of the primary link and the nonprimary link includes:

performing, by the second AP affiliated with the first MLD, a new backoff procedure of the nonprimary link at the same time as performing a new backoff procedure of the primary link following deferral procedure when a BC value of the backoff procedure of the primary link reaches zero.

In some embodiments, synchronizing the initiations of the backoff procedures of the primary link and the nonprimary link includes:

stopping, by the second AP affiliated with the first MLD, the backoff procedure of the nonprimary link or continuing, by the second AP affiliated with the first MLD, the backoff procedure of the nonprimary link during the data transmission of the primary link when the first STA affiliated with the first MLD initiates data transmission of the primary link and a BC value of the nonprimary link does not reach zero.

In some embodiments, the method further including:

obtaining, by the second AP affiliated with the first MLD, an EDCA transmission opportunity (TXOP) for the nonprimary link and initiating, by the second AP affiliated with the first MLD, the data transmission of the nonprimary link with a start time aligned with a start time of the data transmission of the primary link when the second AP affiliated with the first MLD continues the backoff procedure of the nonprimary link.

In some embodiments, the method further including:

stopping, by the second AP affiliated with the first MLD, the backoff procedure of the nonprimary link at an end of the data transmission of the primary link when not continuing the backoff procedure of the nonprimary link.

In some embodiments, initiating data transmission via the primary link and the nonprimary link based on synchronization of EDCA operations on the primary link and the nonprimary link includes:

allowing, by the first AP affiliated with the first MLD, the primary link to access a medium thereof at a time of issuance of PHY-TXSTART.request for the primary link based on the EDCA operation on the primary link; and allowing, by the second AP affiliated with the first MLD, the nonprimary link to access a medium thereof at a time of issuance of PHY-TXSTART.request for the nonprimary link based on the EDCA operation on the nonprimary links.

In some embodiments, the method further including:

initiating, by the first AP affiliated with the first MLD, the data transmission on the primary link when a medium on the primary link is idle and the first STTA affiliated with the first MLD obtains an EDCA TXOP in the primary link; or initiating, by the second AP affiliated with the first MLD, the data transmission of the nonprimary link together with the data transmission of the primary link when the medium on the primary link and nonprimary link is idle, a BC of the nonprimary link is already zero, and the first AP affiliated with the first MLD obtains an EDCA TXOP in the primary link.

In some embodiments, the method further including:

not transmitting, by the first AP affiliated with the first MLD, and keeping, by the first AP affiliated with the first MLD, a BC value of the primary link at zero when the BC value of the primary link reaches zero; or not transmitting, by the second AP affiliated with the first MLD, and keeping, by the second AP affiliated with the first MLD, a BC value of the nonprimary link at zero when the BC value of the nonprimary link reaches zero.

In some embodiments, the method further including:

performing, by the first AP affiliated with the first MLD, a new backoff procedure of the primary link in a case that a BC value of the primary link has already reached zero; or performing, by the second AP affiliated with the first MLD, a new backoff procedure of the nonprimary link in a case that a BC value of the nonprimary link has already reached zero.

In some embodiments, initiating transmissions via the primary link and the nonprimary link includes:

aligning, by the plurality of APs affiliated with the first MLD, start times of physical layer protocol data units (physical layer convergence procedure protocol data unit, PPDUs) scheduled for the transmissions on the primary link and the nonprimary link.

In some embodiments, primary link and nonprimary link (PLNPL) medium access mode subfield is specified for negotiation of one of PLNPL medium access modes during a multi-link setup between the first MLD and the second MLD, values of the PLNPL medium access mode subfield corresponding to different PLNPL medium access modes being different.

In some embodiments, the primary link and nonprimary link (PLNPL) medium access mode subfield is indicated in a common Info field of a basic multi-link element.

In some embodiments, the primary link and the nonprimary link are nonsimultaneous transmit and receive (NSTR) link pair.

In some embodiments, the primary link and the nonprimary link are operated on PLNPL mode.

In some embodiments, the first MLD is a NSTR mobile AP MLD or an AP MLD operating in the PLNPL mode, and the second MLD is a non-AP MLD associated with the NSTR mobile AP MLD or a non-AP MLD operating in PLNPL mode.

In the embodiments, another communication method is provided, which includes:

providing, by a plurality of stations (STAs) affiliated with a second multi-link device (MLD), a primary link and a nonprimary link, the second MLD being a non-access point (non-AP) MLD, the primary link being connected between a first AP affiliated with a first MLD and a first STA affiliated with the second MLD, and the nonprimary link being connected between a second AP affiliated with the first MLD and a second STA affiliated with the second MLD; and initiating, by the plurality of STAs affiliated with the second MLD, data transmissions via the primary link and the nonprimary link based on synchronization of enhanced distributed channel access (EDCA) operations on the primary link and the nonprimary link.

In some embodiments, the EDCA operations include backoff procedures, and initiating data transmission via the primary link and the nonprimary link based on synchronization of EDCA operations on the primary link and the nonprimary link includes:

synchronizing, by the plurality of STAs affiliated with the second MLD, initiations of the backoff procedures of the primary link and the nonprimary link.

In some embodiments, synchronizing the initiations of the backoff procedures of the primary link and the nonprimary link includes:

invoking, by the second STA affiliated with the second MLD, the backoff procedure of the nonprimary link at the same time as invoking the backoff procedure of the primary link.

In some embodiments, synchronizing the initiations of the backoff procedures of the primary link and the nonprimary link includes:

setting, by the second STA affiliated with the second MLD, an interframe space (IFS) of the nonprimary link for the backoff procedure as a value which is the same as an IFS used by the primary link.

In some embodiments, synchronizing the initiations of the backoff procedures of the primary link and the nonprimary link includes:

setting, by the second STA affiliated with the second MLD, an initial backoff counter (BC) value of the nonprimary link for the backoff procedure as a value that is equal to or less than an initial BC value of the primary link.

In some embodiments, synchronizing the initiations of the backoff procedures of the primary link and the nonprimary link includes:

determining, by the second STA affiliated with the second MLD, a medium as idle for the backoff procedure of the nonprimary link when the medium is deemed idle as indicated by physical and virtual carrier sense (CS) mechanism on both the primary link and the nonprimary link.

In some embodiments, synchronizing the initiations of the backoff procedures of the primary link and the nonprimary link includes:

resuming or restarting, by the second STA affiliated with the second MLD, the backoff procedure of the nonprimary link at the same time as resuming the backoff procedure for the primary link when a BC value of the nonprimary link is larger than a BC value of the primary link.

In some embodiments, synchronizing the initiations of the backoff procedures of the primary link and the nonprimary link includes:

performing, by the second STA affiliated with the second MLD, a new backoff procedure of the nonprimary link at the same time as performing a new backoff procedure of the primary link following deferral procedure when a BC value of the backoff procedure of the primary link reaches zero.

In some embodiments, synchronizing the initiations of the backoff procedures of the primary link and the nonprimary link includes:

stopping, by the second STA affiliated with the second MLD, the backoff procedure of the nonprimary link or continuing, by the second MLD affiliated with the second MLD, the backoff procedure of the nonprimary link during the data transmission of the primary link when the first STA affiliated with the second MLD initiates data transmission of the primary link and a BC value of the nonprimary link does not reaching zero.

In some embodiments, the method further including:

Obtaining, by the second STA affiliated with the second MLD, an EDCA transmission opportunity (TXOP) for the nonprimary link and initiating, by the second MLD affiliated with the second MLD, the data transmission of the nonprimary link with a start time aligned with a start time of the data transmission of the primary link when the second STA affiliated with the second MLD continues the backoff procedure of the nonprimary link.

In some embodiments, the method further including:

stopping, by the second STA affiliated with the second MLD, the backoff procedure of the nonprimary link at an end of the data transmission of the primary link when not continuing the backoff procedure of the nonprimary link.

In some embodiments, initiating data transmission via the primary link and the nonprimary link based on synchronization of EDCA operations on the primary link and the nonprimary link includes:

allowing, by the first STA affiliated with the second MLD, the primary link to access a medium thereof at a time of issuance of PHY-TXSTART.request for the primary link based on the EDCA operation on the primary link; and allowing, by the second STA affiliated with the second MLD, the nonprimary link to access a medium thereof at a time of issuance of PHY-TXSTART.request for the nonprimary link based on the EDCA operation on the nonprimary links.

In some embodiments, the method further including:

initiating, by the first STA affiliated with the second MLD, the data transmission on the primary link when a medium on the primary link is idle and the first STA affiliated with the second MLD obtains an EDCA TXOP in the primary link; or initiating, by the second STA affiliated with the second MLD, the data transmission of the nonprimary link together with the data transmission of the primary link when the medium on the primary link and the nonprimary link is idle, a BC of the nonprimary link is already zero, and the first STA affiliated with the second MLD obtains an EDCA TXOP in the primary link.

In some embodiments, the method further including:

not transmitting, by the first STA affiliated with the second MLD, and keeping, by the first STA affiliated with the second MLD, a BC value of the primary link at zero when the BC value of the primary link reaches zero; or not transmitting, by the second STA affiliated with the second MLD, and keeping, by the second STA affiliated with the second MLD, a BC value of the nonprimary link at zero when the BC value of the nonprimary link reaches zero.

In some embodiments, further including:

performing, by the first STA affiliated with the second MLD, a new backoff procedure of the primary link in a case that a BC value of the primary link has already reached zero; or performing, by the second STA affiliated with the second MLD, a new backoff procedure of the nonprimary link in a case that a BC value of the nonprimary link has already reached zero.

In some embodiments, initiating transmissions via the primary link and the nonprimary link includes:

aligning, by the plurality of STAs affiliated with the second MLD, start times of physical layer protocol data units (PPDUs) scheduled for the transmissions on the primary link and the nonprimary.

In some embodiments, primary link and nonprimary link (PLNPL) medium access mode subfield is specified for negotiation of one of PLNPL medium access modes during a multi-link setup between the first MLD and the second MLD, values of the PLNPL medium access mode subfield corresponding to different PLNPL medium access modes being different.

In some embodiments, the primary link and nonprimary link (PLNPL) medium access mode subfield is indicated in a common Info field of a basic multi-link element.

In some embodiments, the primary link and the nonprimary link are nonsimultaneous transmit and receive (NSTR) link pair.

In some embodiments, the primary link and the nonprimary link are operated on PLNPL mode.

In some embodiments, the first MLD is a NSTR mobile AP MLD or an AP MLD operating in the PLNPL mode, and the second MLD is a non-AP MLD associated with the NSTR mobile AP MLD or a non-AP MLD operating in PLNPL mode.

In multi-link operation (MLO), a MLD may be configured with one of two properties, which are simultaneous transmit and receive (STR) and nonsimultaneous transmit and receive (NSTR). In the STR, it allows transmission and reception on different links at the same time. However, in NSTR, it does not allow transmission and reception on different links at the same time. That is, at the same time, merely transmitting would be performed on all links, or merely receiving would be performed on all links.

A general rule of the channel access for the NSTR Mobile access point (AP) multi-link device (MLD) may be the follows.

An NSTR mobile AP MLD may designate one link of an NSTR link pair as the primary link to transmit Beacon and Probe Response frames. The other link of the NSTR link pair is the nonprimary link.

Stations (STAs) affiliated with a non-AP MLD that is associated with an NSTR mobile AP MLD and APs affiliated with an NSTR mobile AP MLD may follow a rule related to start time sync physical layer protocol data units (PPDUs) medium access when intending to transmit in the nonprimary link with the following additional constraints.

An STA affiliated with the non-AP MLD may initiate a PPDU transmission to its associated AP affiliated with the NSTR mobile AP MLD in the nonprimary link only if the STA affiliated with the same MLD in the primary link is also initiating the PPDU as a TXOP holder with the same start time.

An AP affiliated with the NSTR mobile AP MLD may initiate a PPDU transmission to its associated non-AP STA in the nonprimary link only if the AP affiliated with the same NSTR mobile AP MLD in the primary link is also initiating the PPDU as a TXOP holder with the same start time.

Start time sync PPDUs medium access:

Each STA of an MLD operating on a pair of NSTR links for that MLD that aligns the start times of the PPDUs scheduled for transmission on more than one link shall ensure that the enhanced distributed channel access (EDCA) rules on each link permit access to the medium on all the links at the time of issuance of the PHY-TXSTART.request for each link.

An STA of an MLD operating on a link that is part of an NSTR link pair for that MLD shall follow the channel access procedure described below:

1) The STA may initiate transmission on a link when the medium is idle as indicated by the physical and virtual CS mechanism and one of the following conditions is met:

a) The STA obtained an EDCA transmission opportunity (TXOP).

b) The backoff counter of the STA is already zero, and the STA operating on the other link of NSTR link pair of the affiliated MLD obtains an EDCA TXOP.

2) When the backoff counter of the STA reaches zero, it may choose to not transmit and keep its backoff counter at zero.

3) If the backoff counter of the STA has already reached zero, it may perform a new backoff procedure following deferral procedures.

However, the synchronization of the EDCA operation across the primary link and nonprimary link needs to be further specified.

For example, FIG. 1 is a schematic diagram of medium access operation according to an exemplary embodiment of the present disclosure. Referring to FIG. 1, a non-AP MLD includes stations STA1 and STA2, and an NSTR mobile AP MLD includes access points AP1 and AP2. In step S110, the station STA1 has data to be sent via the primary link. The station STA1 may invoke an EDCA backoff procedure with an arbitration interframe space number (AIFSN) equal to 3 and an initial backoff counter (BC) value equal to 6. Also, the station STA2 invokes another EDCA backoff procedure with an AIFSN equal to 3 and a backoff counter (BC) value equal to 7 via the nonprimary link (step S120). However, the medium is busy in the primary link, and the station STA2 may perform a new backoff procedure if the BC value has already reached zero. It should be noticed that in a new backoff procedure of the station STA1 in the primary link, if its BC value has reached zero but the BC value of the station STA 2 in the nonprimary link does not reach zero, the station STA1 may keep the BC value at zero and wait (step S140). The station STA1 may waste one or serval timeslots and not transmit data. Unfortunately, if the station STA1 encounters with medium busy condition, the station STA1 would perform another new backoff procedure (step S150). Based on this situation, the station STA1 may waste its transmission time or lose its transmission TXOP due to the EDCA operation of STA2 in the nonprimary link being asynchronous with that of STA1 in the primary link. Therefore, exemplary embodiments of the present disclosure are proposed.

Figure 2:
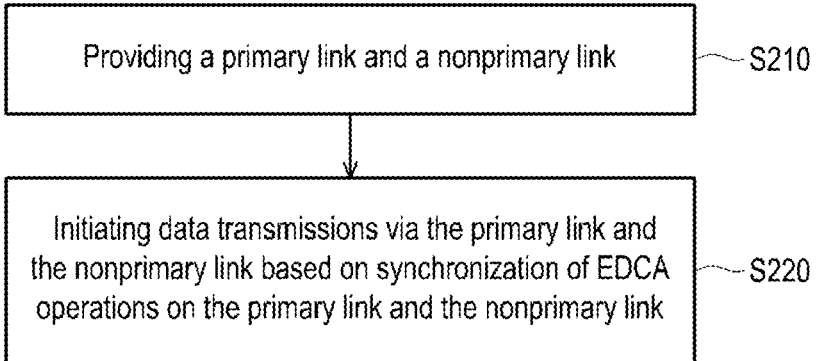
FIG. 2 is a flowchart of a communication method according to an exemplary embodiment of the present disclosure.

FIG. 2 is a flowchart of a communication method according to an exemplary embodiment of the present disclosure. Referring to FIG. 2, multiple APs affiliated with a first MLD provide a primary link and a nonprimary link (step S210). In some embodiments, the first MLD is an AP MLD. In one embodiment, the first MLD may be an NSTR mobile AP MLD or an AP MLD operating in primary link and nonprimary link (PLNPL) mode. In some embodiments, the first MLD may be other AP MLDs providing a pair of links. In one embodiment, a STA affiliated with a MLD may be an AP STA or a non-AP STA. It should be noticed that, in some embodiments, the APs affiliated with the first MLD may be called as STAs affiliated with the first MLD. The STAs affiliated with a first MLD are AP STAs. The APs affiliated with the first MLD may be operated at different frequency bands, for example, 2.4 GHZ, 5 GHZ, or 6 GHz.

In one embodiment, the primary link and the nonprimary link are operated on PLNPL mode.

The PLNPL (Primary Link and Nonprimary Link) mode may be configured as:

1. When a non-AP MLD is operating in the PLNPL (Primary Link and Nonprimary Link) mode with an NSTR Mobile AP MLD with which the non-AP MLD is associated supporting the PLNPL mode, the following may be applied:

(1) For at least one link pair of the non-AP MLD (e.g., the second MLD), the two links belonging to the link pair, which may be a STR or NSTR link pair have been successfully set up between the non-AP MLD and the AP MLD (e.g., the first MLD), and one link is designated as a primary link and the other link is designated as a nonprimary link during the multi-link setup or after multi-link setup.

(2) The setup of the link between the non-AP STA affiliated with the non-AP MLD and the AP affiliated with the NSTR Mobile AP MLD in the nonprimary link is performed by the exchange of the manage frames between the non-AP STA affiliated with the non-AP MLD and the AP affiliated with the NSTR Mobile AP MLD in the primary link.

(3) The STA affiliated with the non-AP MLD (STA of the second MLD) in the nonprimary link acquires the information of the complete or partial profile of the AP, that is affiliated with the AP MLD in the nonprimary link and the STA is associated with, from the specific management frames, which are transmitted by an AP affiliated with the AP MLD in the primary and received by the STA affiliated with the same non-AP MLD in the nonprimary link.

(4) STAs affiliated with the non-AP MLD that is associated with the NSTR mobile AP MLD follows the procedure of start time sync PPDUs medium access when intending to transmit in the nonprimary link with the following additional constraints.

A STA affiliated with the non-AP MLD may initiate a PPDU transmission to its associated AP affiliated with the NSTR mobile AP MLD in the nonprimary link only if the STA affiliated with the same MLD in the primary link is also initiating the PPDU as a TXOP holder with the same start time.

2. When an NSTR Mobile AP MLD is operating in the PLNPL mode with a non-AP MLD which is associated with the AP MLD supporting the PLNPL mode, the following may be applied:

(1) For at least one NSTR link pair of the AP MLD, the two links belonging to the link pair have been successfully set up between the AP MLD and the non-AP MLD, and one link is designated as a primary link and the other link is designated as a nonprimary link during the multi-link setup or after multi-link setup.

(2) The setup of the link between the non-AP STA affiliated with the non-AP MLD and the AP affiliated with the NSTR Mobile AP MLD in the nonprimary link is performed by the exchange of the manage frames between the non-AP STA affiliated with the non-AP MLD and the AP affiliated with the NSTR Mobile AP MLD in the primary link.

(3) Only the AP (or the AP STA) affiliated with the AP MLD in the primary link sends Beacon and Probe Response frames. The AP affiliated with the AP MLD in the nonprimary link does not send Beacon and Probe Response frames.

(4) The information of the complete or partial profile of the AP, that is affiliated with the AP MLD in the nonprimary link, is carried by the specific management frames, which are transmitted by an AP affiliated with the same AP MLD in the primary and received by the STA affiliated with the non-AP MLD in the nonprimary link, to the STA that is affiliated with the non-AP MLD and associated with the AP.

(5) APs (or AP STAs) affiliated with an NSTR mobile AP MLD follow the procedure of start time sync PPDUs medium access when intending to transmit in the nonprimary link with the following additional constraints.

An AP (or AP STA) affiliated with the NSTR mobile AP MLD initiates a PPDU transmission to its associated non-AP STA in the nonprimary link only if the AP affiliated with the same NSTR mobile AP MLD in the primary link is also initiating the PPDU as a TXOP holder with the same start time.

In one embodiment, the primary link and the nonprimary link belong to a NSTR link pair. The primary link is connected between a first AP affiliated with the first MLD and a first STA affiliated with a second MLD, and the nonprimary link is connected between a second AP affiliated with the first MLD and a second STA affiliated with the second MLD. In one embodiment, the second MLD is a non-AP MLD associated with an NSTR mobile AP MLD (if the first MLD is the NSTR mobile AP MLD) or a non-AP MLD operating in PLNPL mode. The second MLD is a non-AP MLD. The STAs (or non-AP STAs) affiliated with the second MLD may be operated at different frequency bands, for example, 2.4 GHZ, 5 GHZ, or 6 GHz. That is, the primary link and the nonprimary link may be operated at different frequency bands or channels. In one embodiment, one or more APs affiliated with the first MLD may transmit beacon frames or probe response frames via the primary link. However, the type of frame or message transmitted via the primary or nonprimary link is not limited thereto.

The APs affiliated with the first MLD initiate data transmissions via the primary link and the nonprimary link based on synchronization of enhanced distributed channel access (EDCA) operations on the primary link and the nonprimary link (step S220). The EDCA operation is related to one or more operations for channel access on links. For example, backoff procedure, deferral procedure, or carrier sensing. In one embodiment, in NSTR, each AP affiliated with the second MLD operating on a pair of links including a primary link and a nonprimary link for that the second MLD may align the start times of the data units (e.g., PPDUs) scheduled for transmissions on the primary link and the nonprimary link. In another embodiment, each AP affiliated with the first MLD operating on a pair of links includes a primary link and the nonprimary link for that the first MLD may align the start times of the data units (e.g., PPDUs) scheduled for transmissions on the primary link and the nonprimary link. That is, the start times of data transmission on both the primary link and the nonprimary link would be aligned.

In one embodiment, the first AP affiliated with the first MLD may allow the primary link to access its medium at a time of issuance of PHY-TXSTART.request for the primary link and the nonprimary link based on the EDCA operation on the primary link, and the second AP affiliated with the first MLD may allow the nonprimary link to access its medium at a time of issuance of PHY-TXSTART.request for the nonprimary link based on the EDCA operation on the nonprimary link. When a medium access control (MAC) layer has data units to be transmitted, the MAC sublayer may send PHY-TXSTART.request to a physical (PHY) layer, so as to initiate data transmission.

one or more APs affiliated with the first MLD may follow the channel access procedure described below.

Regarding AP (or AP STA) in the primary link (e.g., the first AP affiliated with the first MLD):

In one embodiment, one or more APs affiliated with the first MLD (e.g., the first AP affiliated with the first MLD) may initiate the data transmission on the primary link when a medium on the primary link is idle and the first AP of the first MLD obtains an EDCA TXOP. The AP in the primary link (e.g., the first AP affiliated with the first MLD) may initiate data transmission on the primary link when the medium is idle as indicated by the physical layer and virtual carrier sense (CS) mechanism and the AP obtained an EDCA TXOP.

In one embodiment, one or more APs affiliated with the first MLD (e.g., the first AP of the first MLD) may not transmit and may keep a BC value of the primary link at zero when the BC value of the primary link reaches zero. That is the data to be transmitted on the primary link is kept on the AP and would not be transmitted. When the BC value of the AP in the primary link reaches zero, it may choose to not transmit and may keep its BC value at zero. Taking FIG. 1 as an example, in step S140, the BC value of the access point AP1 in the primary link has already reached zero, but the BC value keeps at zero for two timeslots until the medium is busy.

In one embodiment, one or more APs affiliated with the first MLD (e.g., the first AP of the first MLD) may perform a new backoff procedure of the primary link in a case that a BC value of the primary link has already reached zero. If the BC value of the AP in the primary link has already reached zero, the AP may perform a new backoff procedure.

Regarding AP (or AP STA) in the nonprimary link (e.g., the second AP affiliated with the first MLD):

In one embodiment, one or more APs affiliated with the first MLD (e.g., the second AP affiliated with the first MLD) may initiate the data transmission of the nonprimary link together with the data transmission of the primary link when the medium on the primary link and the nonprimary link being idle, the BC value of the nonprimary link being already zero, and obtaining an EDCA TXOP in the primary link. The AP in the nonprimary link (e.g., the second AP of the first MLD) may initiate data transmission on the nonprimary link when the medium is idle as indicated by the physical layer and virtual CS mechanism and the AP obtained an EDCA TXOP in the primary link. In some embodiments, the data transmission of the nonprimary link may be initiated when the BC value of the AP in the nonprimary link is zero and the AP in the primary link obtains an EDCA TXOP. If the BC value of the AP in the nonprimary link (e.g., the second AP of the first MLD) may just reach zero or has already reached zero and kept at zero and the AP in the primary link obtains the EDCA TXOP, both data transmissions on the primary link and the nonprimary link would be initiated.

In one embodiment, one or more APs affiliated with the first MLD (e.g., the second AP affiliated with the first MLD) may stop transmitting and may keep a BC value of the nonprimary link at zero when the BC value of the nonprimary link reaches zero. When the BC value of the STA in the nonprimary link reaches zero, the STA may choose to not transmit and may keep its BC value at zero. That is the data to be transmitted on the nonprimary link is kept on the STA and would not be transmitted. Taking FIG. 1 as an example, after step S120, the BC value of the access point AP1 in the nonprimary link has already reached zero, but the BC value keeps at zero for one timeslot until the medium is busy.

In one embodiment, one or more APs affiliated with the first MLD (e.g., the second AP of the first MLD) may perform a new backoff procedure of the nonprimary link when a BC value of the primary link reaches zero. If the BC value of the AP in the nonprimary link has already reached zero, the AP may perform a new backoff procedure.

In one embodiment, the first STA affiliated with the second MLD may allow the primary link to access its medium at a time of issuance of PHY-TXSTART.request for the primary link and the nonprimary link based on the EDCA operation on the primary link, and the second STA affiliated with the second MLD may allow the nonprimary link to access its medium at a time of issuance of PHY-TXSTART.request for the nonprimary link based on the EDCA operation on the nonprimary link. When a medium access control (MAC) layer has data units to be transmitted, the MAC sublayer may send PHY-TXSTART.request to a physical (PHY) layer, so as to initiate data transmission.

one or more STAs affiliated with the second MLD may follow the channel access procedure described below.

Regarding STA (or non-AP STA) in the primary link (e.g., the first STA affiliated with the second MLD):

In one embodiment, one or more STAs affiliated with the second MLD (e.g., the first STA affiliated with the second MLD) may initiate the data transmission on the primary link when a medium on the primary link is idle and the STA obtains an EDCA TXOP. The STA in the primary link (e.g., the first STA of the second MLD) may initiate data transmission on the primary link when the medium is idle as indicated by the physical layer and virtual carrier sense (CS) mechanism and the STA obtained an EDCA TXOP.

In one embodiment, one or more STAs affiliated with the second MLD (e.g., the first STA affiliated with the second MLD) may stop transmitting and may keep a BC value of the primary link at zero when the BC value of the primary link reaches zero. When the BC value of the STA in the primary link reaches zero, it may choose to not transmit and may keep its BC value at zero. That is the data to be transmitted on the primary link is kept on the STA and would not be transmitted. Taking FIG. 1 as an example, in step S140, the BC value of the station STA1 in the primary link has already reached zero, but the BC value keeps at zero for two timeslots until the medium is busy.

In one embodiment, one or more STAs affiliated with the second MLD (e.g., the first STA affiliated with the second MLD) may perform a new backoff procedure of the primary link in a case that a BC value of the primary link has already reached zero. If the BC value of the STA in the primary link has already reached zero, the STA may perform a new backoff procedure.

Regarding STA (or non-AP STA) in the nonprimary link (e.g., the second STA affiliated with the second MLD):

In one embodiment, one or more STAs affiliated with the second MLD (e.g., the second STA affiliated with the second MLD) may initiate the data transmissions of the nonprimary link together with the data transmission of the primary link when the medium on the primary link and the nonprimary link being idle, the BC value of nonprimary link being already zero, and obtaining an EDCA TXOP in the primary link. The STA in the nonprimary link (e.g., the second STA affiliated with the second MLD) may initiate data transmission on the nonprimary link when the medium is idle as indicated by the physical layer and virtual CS mechanism and the STA obtained an EDCA TXOP in the primary link. In some embodiments, the data transmission of the nonprimary link may be initiated when the BC value of the STA in the nonprimary link is zero and the STA in the primary link obtains an EDCA TXOP. If the BC value of the STA in the nonprimary link (e.g., the second STA affiliated with the second MLD) may just reach zero or has already reached zero and kept at zero and the STA in the primary link obtains the EDCA TXOP, both data transmissions on the primary link and the nonprimary link would be initiated.

In one embodiment, one or more STAs affiliated with the second MLD (e.g., the second STA affiliated with the second MLD) may stop transmitting and may keep a BC value of the nonprimary link at zero when the BC value of the nonprimary link reaches zero. When the BC value of the STA in the nonprimary link reaches zero, the STA may choose to not transmit and may keep its BC value at zero. That is the data to be transmitted on the nonprimary link is kept on the STA and would not be transmitted. Taking FIG. 1 as an example, after step S120, the BC value of the station STA1 in the nonprimary link has already reached zero, but the BC value keeps at zero for one timeslot until the medium is busy.

In one embodiment, one or more STAs affiliated with the second MLD (e.g., the second STA affiliated with the second MLD) may perform a new backoff procedure of the nonprimary link when a BC value of the primary link reaches zero. If the BC value of the STA in the nonprimary link has already reached zero, the STA may perform a new backoff procedure.

In one embodiment, the EDCA operations include backoff procedures. The first MLD may synchronize the initiations of the backoff procedures of the primary link and the nonprimary link.

In one embodiment, one or more STAs affiliated with the second MLD that aligns the start times of the data units (e.g., PPDUs) scheduled for transmission may follow the channel access rules related to the backoff procedure described below.

Regarding AP (or AP STA) in the nonprimary link:

In one embodiment, one or more APs affiliated with the first MLD (e.g., the second AP affiliated with the first MLD) may invoke the (EDCA) backoff procedure of the nonprimary link at the same time as invoking the (EDCA) backoff procedure of the primary link.

In one embodiment, one or more APs affiliated with the first MLD (e.g., the second AP affiliated with the first MLD) may set an interframe space (IFS) (e.g. AIFS) of the nonprimary link for the backoff procedure as a value which is the same as an IFS used by the primary link. When the AP performs the backoff procedure in the nonprimary link, the AP in the nonprimary link uses the same IFS as the AP in the primary link uses when performing its backoff procedure in the primary link.

In one embodiment, one or more APs affiliated with the first MLD (e.g., the second AP affiliated with the first MLD) may set an initial BC value of the nonprimary link for its backoff procedure as a value that is equal to or less than an initial BC value of the primary link for its backoff procedure.

When the backoff procedure is invoked by the AP in the nonprimary link (e.g., the second AP affiliated with the first MLD), the initial BC value of its backoff counter is set to the value which is the same as or less than the value to which the backoff counter of the AP in the primary link (e.g., the first AP affiliated with the first MLD) has been set when invoking its backoff procedure in the primary link. For example, the initial BC value of the backoff procedure in the primary link is 5, and the initial BC value of the backoff procedure in the nonprimary link is 5, 4, or less.

In one embodiment, one or more APs affiliated with the first MLD (e.g., the second AP affiliated with the first MLD) may determine a medium as idle for the backoff procedure of the nonprimary link when the medium is deemed idle as indicated by physical and virtual carrier sense (CS) mechanism on both the primary link and the nonprimary link. When the AP in the nonprimary link (e.g., the second AP affiliated with the first MLD) performs its backoff procedure, the medium is deemed idle as indicated by the physical and virtual CS mechanism not only in the nonprimary link but also in the primary link at the same time.

In one embodiment, one or more APs affiliated with the first MLD (e.g., the second AP affiliated with the first MLD) may resume or restart the backoff procedure of the nonprimary link at the same time as resuming the backoff procedure for the primary link when a BC value of the nonprimary link is larger than a BC value of the primary link. When the AP in the primary link (e.g., the first AP affiliated with the first MLD) resumes its backoff procedure following a medium busy condition and the current value of the backoff counter of the AP in the nonprimary link (e.g., the second AP affiliated with the first MLD) is larger than the current value of the backoff counter of the AP in the primary link, the AP in the nonprimary link may resume or restart its backoff procedure at the same time and the new or initial BC value of the backoff counter of the AP in the nonprimary link is set to the value which is the same as or less than the current value of the BC of the AP in the primary link has when it resumes its backoff procedure.

In one embodiment, one or more APs affiliated with the first MLD (e.g., the second AP of the first MLD) may perform a new backoff procedure of the nonprimary link at the same time as performing a new backoff procedure of the primary link following deferral procedure when a BC value of the backoff procedure of the primary link reaching zero. If the backoff counter of the AP in the primary link has already reached zero and it performs a new backoff procedure following deferral procedures for channel access contention, the AP (e.g., the second AP affiliated with the first MLD) in the nonprimary link may also perform a new backoff procedure at the same time as the AP in the primary link (e.g., the first AP affiliated with the first MLD) performs a new backoff procedure.

In one embodiment, one or more APs affiliated with the first MLD (e.g., the second AP affiliated with the first MLD) may stop the backoff procedure of the nonprimary link or continue the backoff procedure of the nonprimary link during the data transmission of the primary link when initiating data transmission of the primary link and a BC value of the nonprimary link does not reach zero. When the AP in the primary link (e.g., the first AP affiliated with the first MLD) initiates transmission but the backoff counter of the AP in the nonprimary link (e.g., the second AP affiliated with the first MLD) doesn't reach zero, the AP in the nonprimary link may stop its backoff procedure immediately or continue its backoff procedure during the transmission of the AP in the primary link.

In one embodiment, one or more APs affiliated with the first MLD (e.g., the second AP affiliated with the first MLD) may obtain an EDCA TXOP for the nonprimary link and initiate the data transmission of the nonprimary link with a start time aligned with a start time of the data transmission of the primary link when the second AP affiliated with the first MLD continues the backoff procedure of the nonprimary link. If the AP in the nonprimary link (e.g., the second AP affiliated with the first MLD) chooses to continue its backoff procedure during the transmission of the AP in the primary link, the AP may obtain an EDCA TXOP and initiate a transmission of a data unit (e.g., PPDU) for which the start time is aligned with the start time of one data unit transmitted by the AP in the primary link.

In one embodiment, one or more APs affiliated with the first MLD (e.g., the second AP affiliated with the first MLD) may stop the backoff procedure of the nonprimary link at an end of the data transmission of the primary link when not continuing the backoff procedure of the nonprimary link. If the AP in the nonprimary link (e.g., the second AP of the first MLD) chooses not to continue its backoff procedure during the transmission of the AP in the primary link, the AP stops its backoff procedure at the end of the transmission of the AP in the primary link.

Regarding (non-AP) STA in the nonprimary link (e.g., the second STA of the second MLD):

In one embodiment, one or more STAs affiliated with the second MLD (e.g., the second STA of the second MLD) may invoke the (EDCA) backoff procedure of the nonprimary link at the same time as invoking the (EDCA) backoff procedure of the primary link.

In one embodiment, one or more STAs affiliated with the second MLD (e.g., the second STA affiliated with the second MLD) may set an IFS (e.g. AIFS) of the nonprimary link for the backoff procedure as a value which is the same as an IFS used by the primary link. When the STA (e.g., the second STA affiliated with the second MLD) performs the backoff procedure in the nonprimary link, the STA in the nonprimary link uses the same IFS as the STA in the primary link uses when performing its backoff procedure in the primary link.

In one embodiment, one or more STAs affiliated with the second MLD (e.g., the second STA affiliated with the second MLD) may set an initial BC value of the nonprimary link for its backoff procedure as a value that is equal to or less than an initial BC value of the primary link for its backoff procedure. When the backoff procedure is invoked by the STA in the nonprimary link (e.g., the second STA affiliated with the second MLD), the initial BC value of its backoff counter is set to the value which is the same as or less than the value to which the backoff counter of the STA in the primary link (e.g., the first STA affiliated with the second MLD) has been set when invoking its backoff procedure in the primary link. For example, the initial BC value of the backoff procedure in the primary link is 9, and the initial BC value of the backoff procedure in the nonprimary link is 9, 8, or less.

In one embodiment, one or more STAs affiliated with the second MLD (e.g., the second STA affiliated with the second MLD) may determine a medium as idle for the backoff procedure of the nonprimary link when the medium is deemed idle as indicated by physical and virtual carrier sense (CS) mechanism on both the primary link and the nonprimary link. When the STA in the nonprimary link (e.g., the second STA of the second MLD) performs its backoff procedure, the medium is deemed idle as indicated by the physical and virtual CS mechanism not only in the nonprimary link but also in the primary link at the same time.

In one embodiment, one or more STAs affiliated with the second MLD (e.g., the second STA affiliated with the second MLD) may resume or restart the backoff procedure of the nonprimary link at the same time as resuming the backoff procedure for the primary link when a BC value of the nonprimary link is larger than a BC value of the primary link. When the STA in the primary link (e.g., the first STA affiliated with the second MLD) resumes its backoff procedure following a medium busy condition and the current value of the backoff counter of the STA in the nonprimary link (e.g., the second STA affiliated with the second MLD) is larger than the current value of the backoff counter of the STA in the primary link, the STA in the nonprimary link may resume or restart its backoff procedure at the same time and the new or initial BC value of the backoff counter of the STA in the nonprimary link is set to the value which is the same as or less than the current value of the BC of the STA in the primary link has when it resumes its backoff procedure.

In one embodiment, one or more STAs affiliated with the second MLD (e.g., the second STA affiliated with the second MLD) may perform a new backoff procedure of the nonprimary link at the same time as performing a new backoff procedure of the primary link following deferral procedure when a BC value of the backoff procedure of the primary link reaches zero. If the backoff counter of the STA in the primary link (e.g., the first STA affiliated with the second MLD) has already reached zero and it performs a new backoff procedure following deferral procedures for channel access contention, the STA in the nonprimary link (e.g., the second STA affiliated with the second MLD) may also perform a new backoff procedure at the same time as the STA in the primary link performs a new backoff procedure.

In one embodiment, one or more STAs affiliated with the second MLD (e.g., the second STA affiliated with the second MLD) may stop the backoff procedure of the nonprimary link or continue the backoff procedure of the nonprimary link during the data transmission of the primary link when the first STA initiates data transmission of the primary link and a BC value of the nonprimary link does not reach zero. When the STA in the primary link (e.g., the first STA affiliated with the second MLD) initiates transmission but the backoff counter of the STA in the nonprimary link (e.g., the second STA affiliated with the second MLD) doesn't reach zero, the STA in the nonprimary link may stop its backoff procedure immediately or continue its backoff procedure during the transmission of the STA in the primary link.

In one embodiment, one or more STAs affiliated with the second MLD (e.g., the second STA affiliated with the second MLD) may obtain an EDCA TXOP for the nonprimary link and initiate the data transmission of the nonprimary link with a start time aligned with a start time of the data transmission of the primary link when the second STA affiliated with the second MLD continues the backoff procedure of the nonprimary link. If the STA in the nonprimary link (e.g., the second STA affiliated with the second MLD) chooses to continue its backoff procedure during the transmission of the STA in the primary link (e.g., the first STA affiliated with the second MLD), the STA may obtain an EDCA TXOP and initiate a transmission of a data unit (e.g., PPDU) for which the start time is aligned with the start time of one data unit transmitted by the STA in the primary link.

In one embodiment, one or more STAs affiliated with the second MLD (e.g., the second STA affiliated with the second MLD) may stop the backoff procedure of the nonprimary link at an end of the data transmission of the primary link when not continuing the backoff procedure of the nonprimary link. If the STA in the nonprimary link (e.g., the second STA affiliated with the second MLD) chooses not to continue its backoff procedure during the transmission of the STA in the primary link (e.g., the first STA affiliated with the second MLD), the STA stops its backoff procedure at the end of the transmission of the STA in the primary link.

Figure 3:
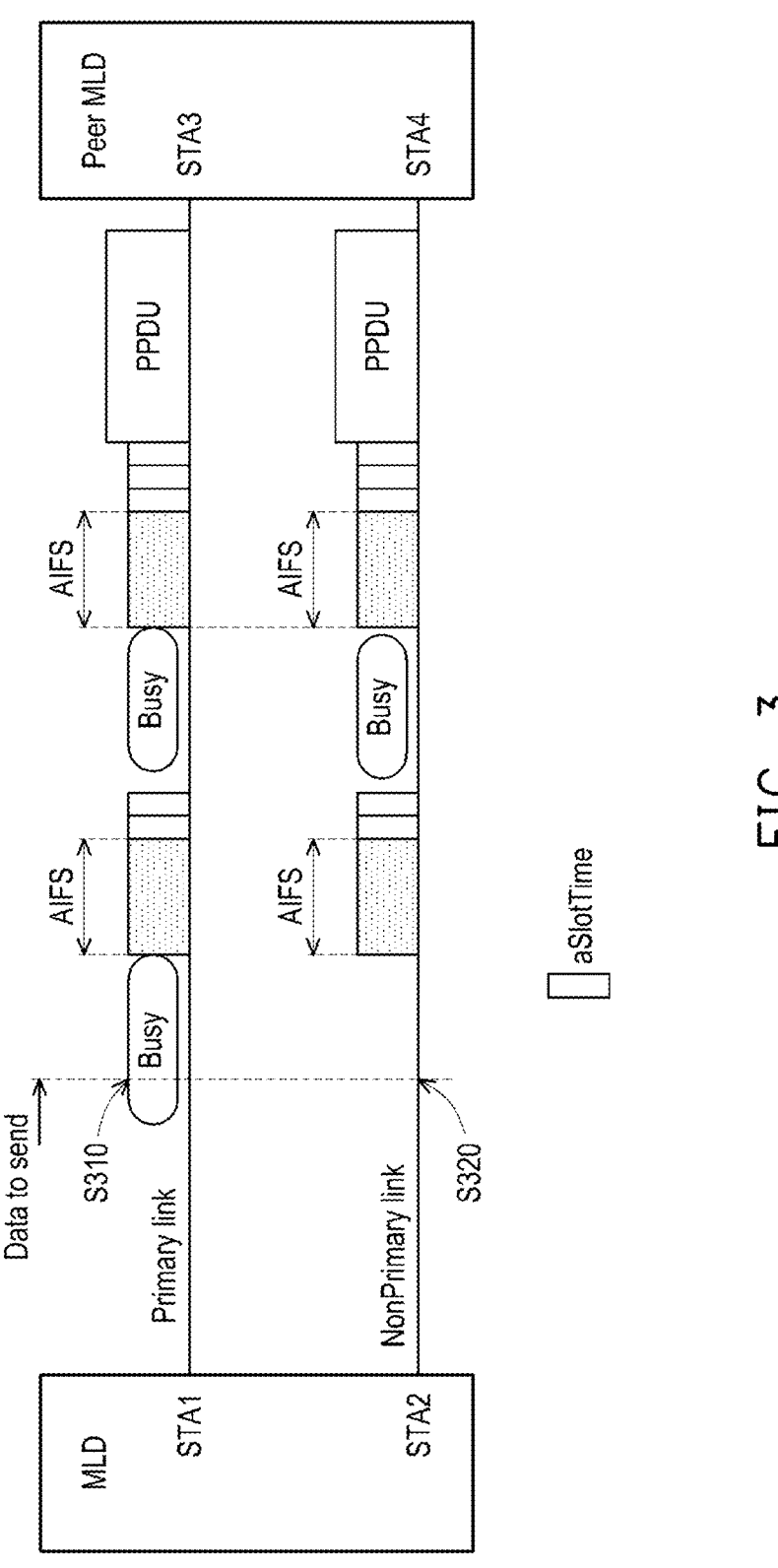
FIG. 3 is a schematic diagram of synchronization of EDCA operation across two links according to an exemplary embodiment of the present disclosure.

FIG. 3 is a schematic diagram of synchronization of EDCA operation across two links according to an exemplary embodiment of the present disclosure. Referring to FIG. 3, MLD is an NSTR mobile AP MLD or a non-AP MLD associated with an NSTR mobile AP MLD or operating in PLNPL mode. If the MLD is a non-AP MLD, the peer MLD is an AP MLD with which the MLD is associated. The stations STA1 and STA2 are affiliated with the MLD, the station STA1 is operating in the primary link, and the station STA2 is operating in the nonprimary link. Alternatively, if the MLD is an AP MLD, the peer MLD is a non-AP MLD which is associated with the MLD. The station STA3 and STA4 are affiliated with the peer MLD, the station STA3 is operating in the primary link, and the station STA4 is operating in the nonprimary link.

When the MLD aligns the start times of the PPDUs scheduled for transmission on the primary link and nonprimary link, the stations STA1 and STA2 follow the channel access procedure described below:

1) The station STA2 in the nonprimary link invokes its EDCA backoff procedure at the same time as the station STA1 in the primary link invokes the EDCA backoff procedure of the station STA1 (steps S310 and S320).

2) The station STA1 uses AIFSN equal to 3 and BC value equal to 6 when initiating its backoff procedure, and the station STA2 also uses AIFSN equal to 3 and initial BC value equal to 6 when initiating its backoff procedure. Furthermore, the AIFS is a duration derived from the value AIFSN by the relation (1):

$$\text{AIFS}=\text{AIFSN}\times a\text{SlotTime}+a\text{SIFSTime}=3\times a\text{SlotTime}+a\text{SIFSTime} \qquad (1)$$

The station STA2 uses the same IFS and initial BC value as the station STA1 uses for performing the backoff procedure.

3) The backoff procedure of the station STA2 follows the additional rule that the medium is deemed idle as indicated by the physical and virtual CS mechanism not only in the nonprimary link but also in the primary link at the same time. For example, shown in FIG. 3, because the medium is not idle in the primary link, the enhanced distributed channel access function (EDCAF) of the station STA2 does not deem the medium idle just after the station STA2 invokes its EDCA backoff procedure although the medium is idle in the nonprimary link. Furthermore, the EDCAF of the station STA2 may decrement its backoff counter for the first time when the medium both in the primary link and the nonprimary link has been idle for the time of AIFS.

4) When the station STA1 in the primary link obtains an EDCA TXOP and the backoff counter of the station STA2 in the nonprimary link is already zero, the station STA1 initiates a transmission on the primary link and the station STA2 initiates the transmission on the nonprimary link at the same time.

When the station STA1 in the primary link resumes its backoff procedure following a medium busy condition and the current value of the backoff counter of the station STA2 in the nonprimary link is larger than the current value of the backoff counter of the station STA1 in the primary link, the station STA2 in the nonprimary link may resume or restart its backoff procedure at the same time. Furthermore, the new or initial BC value of the backoff counter of the station STAs in the nonprimary link is set to the value which is the same as or less than the current value of the BC of the station STA1 in the primary link has when resuming its backoff procedure.

Figure 4:
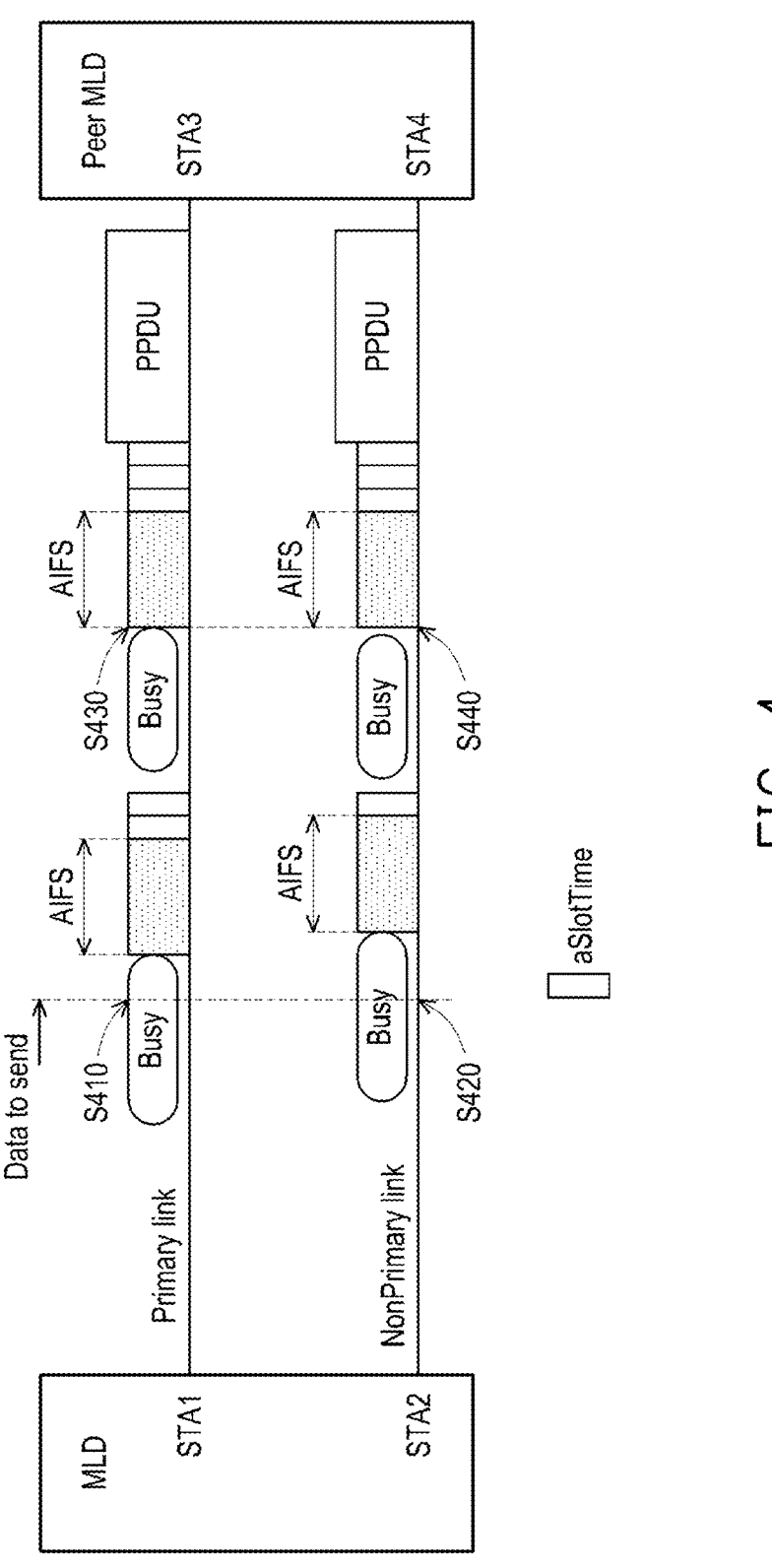
FIG. 4 is a schematic diagram of synchronization of EDCA operation across two links according to an exemplary embodiment of the present disclosure.

FIG. 4 is a schematic diagram of synchronization of EDCA operation across two links according to an exemplary embodiment of the present disclosure. Referring to FIG. 4, the station STA2 in the nonprimary link invokes its EDCA backoff procedure at the same time as the station STA1 in the primary link invokes the EDCA backoff procedure of the station STA1 (steps S410 and S420).

The difference between FIG. 3 and FIG. 4 is that in FIG. 4 when the BC of the station STA1 counts down to 3, the station STA1 encounters a medium busy condition. Then, the station STA1 resumes its EDCA backoff procedure with the BC value equal to 3 following the medium busy condition (step S430). At the same time, the station STA2 resumes its backoff procedure and the new BC value of the backoff counter of the stations STA2 is set to 3 (step S440), the value which is the same as the current value of BC of the station STA1 when the station STA1 resumes its backoff procedure.

Furthermore, in FIG. 4, when the station STA1 in primary link obtains an EDCA TXOP and the backoff counter of the station STA2 in the nonprimary link is already zero, the station STA1 initiates a transmission on the primary link and thee station STA2 initiate the transmission on the nonprimary link at the same time.

Figure 5:
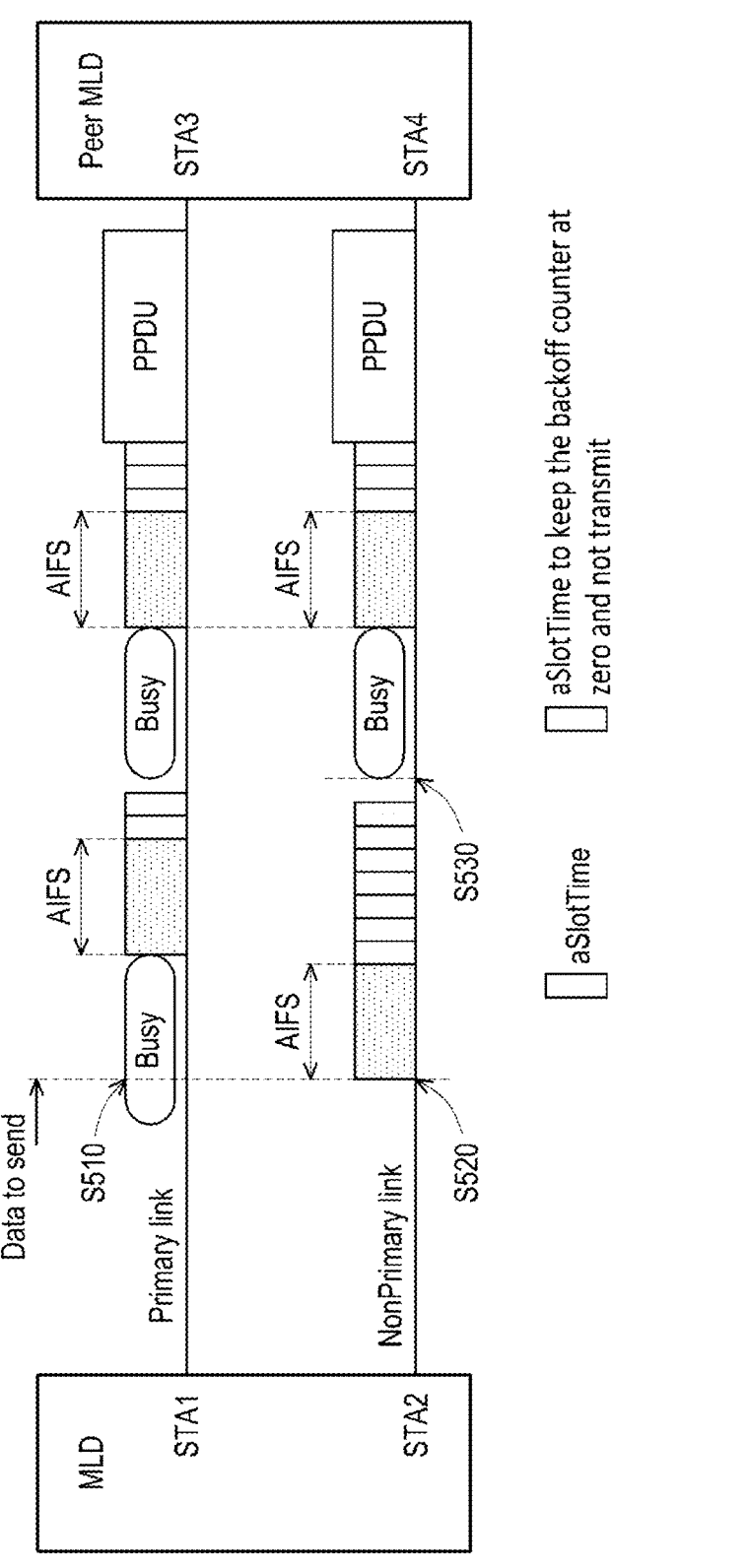
FIG. 5 is a schematic diagram of synchronization of EDCA operation across two links according to an exemplary embodiment of the present disclosure.

FIG. 5 is a schematic diagram of synchronization of EDCA operation across two links according to an exemplary embodiment of the present disclosure. Referring to FIG. 5, the station STA2 in the nonprimary link invokes its EDCA backoff procedure at the same time as the station STA1 in the primary link invokes the EDCA backoff procedure of the station STA1 (steps S510 and S520).

The difference between FIG. 3 and FIG. 5 is that in FIG. 5 the station STA1 uses AIFSN equal to 3 and initial BC value equal to 6 when initiating its backoff procedure, and the station STA2 uses AIFSN equal to 3 and initial BC value equal to 3 when initiating its backoff procedure. The station STA2 uses the same IFS as the IFS of the station STA1 but uses the initial BC value which is less than the initial BC value of the station STA1.

After the station STA2 invokes its EDCA backoff procedure, the EDCAF of the station STA2 deems the medium idle for the medium is idle in the nonprimary link as indicated by the physical and virtual CS mechanism and decrements its backoff counter for the first time when the medium in the nonprimary link has been idle for the time of AIFS. Then, the station STA2 continues to decrement its backoff counter as the medium in the nonprimary link is idle for several time slots (e.g., aSlotTimes as shown in FIG. 5) until the backoff counter value reaches zero. However, the station STA2 cannot transmit as the medium is busy in the primary link and keep its backoff counter at zero. When the station STA2 detects that the medium in the nonprimary link is busy, it restarts a new backoff procedure (step S530).

In some embodiments, when the station STA1 in the primary link obtains an EDCA TXOP and the backoff counter of the station STA2 in the nonprimary link is also already zero during the new backoff procedure, the station STA1 initiates a transmission on the primary link and the station STA2 initiates the transmission on the nonprimary link at the same time.

Figure 6:
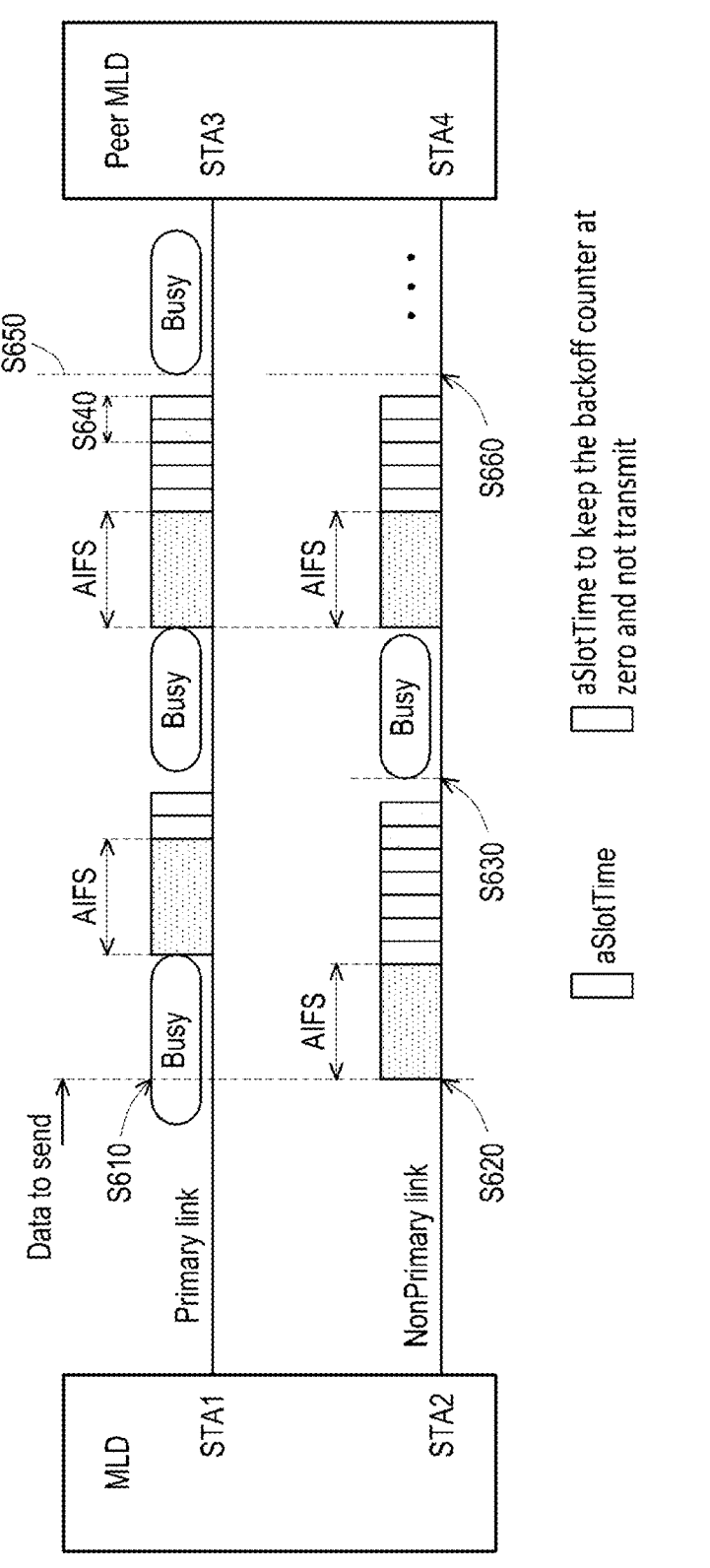
FIG. 6 is a schematic diagram of synchronization of EDCA operation across two links according to an exemplary embodiment of the present disclosure.

FIG. 6 is a schematic diagram of synchronization of EDCA operation across two links according to an exemplary embodiment of the present disclosure. Referring to FIG. 6, the station STA2 in the nonprimary link invokes its EDCA backoff procedure at the same time as the station STA1 in the primary link invokes the EDCA backoff procedure of the station STA1 (steps S610 and S620).

The difference between FIG. 3 and FIG. 6 is that in FIG. 6 when the station STA2 detects that the medium in the nonprimary link is busy, it restarts a new backoff procedure (step S630). The station STA1 may keep the BC value at zero and wait if the BC value of the station STA 2 in the nonprimary link does not reach zero (step S640). However, when the backoff counter of the station STA1 in the primary link has already reached zero and it performs a new backoff procedure following deferral procedures, the station STA2 in the nonprimary link also performs a new backoff procedure at the same time as the station STA1 performs its new backoff procedure (steps S650 and S660).

Figure 7:
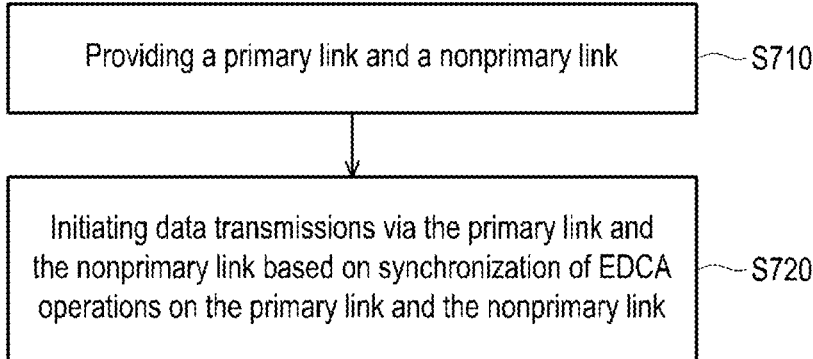
FIG. 7 is a flowchart of a communication method according to an exemplary embodiment of the present disclosure.

FIG. 7 is a flowchart of a communication method according to an exemplary embodiment of the present disclosure. Referring to FIG. 7, a second MLD provides a primary link and a nonprimary link (step S710). In some embodiments, the second MLD is a non-AP MLD. In one embodiment, the second MLD is a non-AP MLD associated with an NSTR mobile AP MLD (if the first MLD is the NSTR mobile AP MLD) or a non-AP MLD operating in PLNPL mode. In some embodiment, the second MLD may be other non-AP MLDs providing a pair of links. In one embodiment, a STA affiliated with a MLD may be an AP STA or a non-AP STA. The STAs affiliated with the second MLD are non-AP STAs. The STAs affiliated with the second MLD may be operated at different frequency bands, for example, 2.4 GHZ, 5 GHZ, or 6 GHZ.

In one embodiment, the primary link and the nonprimary link are operated on PLNPL mode. In one embodiment, the primary link and the nonprimary link belong to a NSTR link pair. The primary link is connected between a first AP affiliated with the first MLD and a first STA affiliated with a second MLD, and the nonprimary link is connected between a second AP affiliated with the first MLD and a second STA affiliated with the second MLD. In one embodiment, the first MLD may be an NSTR mobile AP MLD or an AP MLD in primary link and nonprimary link (PLNPL) mode. The second MLD initiates data transmissions via the primary link and the nonprimary link based on synchronization of enhanced distributed channel access (EDCA) operations on the primary link and the nonprimary link (step S720). The detailed description of step S710 to step S720 could be referred to FIG. 1-FIG. 6 and would be omitted.

In one embodiment, the first STA affiliated with the second MLD may allow the primary link to access its medium at a time of issuance of PHY-TXSTART.request for the primary link and the nonprimary link based on the EDCA operation on the primary link, and the second STA affiliated with the second MLD may allow the nonprimary link to access its medium at a time of issuance of PHY-TXSTART.request for the nonprimary link based on the EDCA operation on the nonprimary link.

In one embodiment, the second MLD operating on a pair of links including a primary link and a nonprimary link for that the second MLD may align the start times of the PPDUs scheduled for transmissions on the primary link and the nonprimary link.

In one embodiment, one or more STAs affiliated with the second MLD (e.g., the first STA affiliated with the second MLD) may initiate the data transmission on the primary link when a medium on the primary link is idle and obtaining an EDCA TXOP.

In one embodiment, one or more STAs affiliated with the second MLD (e.g., the first STA affiliated with the second MLD) may not transmit and may keep a BC value of the primary link at zero when the BC value of the primary link reaches zero.

In one embodiment, one or more STAs affiliated with the second MLD (e.g., the first STA affiliated with the second MLD) may perform a new backoff procedure of the primary link when a BC value of the primary link reaches zero.

In one embodiment, one or more STAs affiliated with the second MLD (e.g., the second STA affiliated with the second MLD) may initiate the data transmission of the nonprimary link together with the data transmission of the primary link when the medium on the nonprimary link is idle, the BC of the nonprimary link is already zero, and the first STA of the second MLD obtains an EDCA TXOP in the primary link. In some embodiments, the data transmission on the nonprimary link may be initiated when the BC value of the STA in the nonprimary link (e.g., the second STA affiliated with the second MLD) is zero and the STA in the primary link (e.g., the first STA of the second MLD) obtains an EDCA TXOP.

In one embodiment, one or more STAs affiliated with the second MLD (e.g., the second STA affiliated with the second MLD) may not transmit and may keep a BC value of the nonprimary link at zero when the BC value of the nonprimary link reaches zero.

In one embodiment, one or more STAs affiliated with the second MLD (e.g., the second STA affiliated with the second MLD) may perform a new backoff procedure of the nonprimary link when a BC value of the nonprimary link reaches zero.

In one embodiment, the EDCA operations include backoff procedures. The second MLD may synchronize the initiations of the backoff procedures of the primary link and the nonprimary link.

In one embodiment, one or more STAs affiliated with the second MLD that aligns the start times of the data units (e.g., PPDUs) scheduled for transmission may follow the channel access rules related to the backoff procedure described below.

In one embodiment, one or more STAs affiliated with the second MLD (e.g., the second STA affiliated with the second MLD) may invoke the (EDCA) backoff procedure of the nonprimary link at the same time as invoking the (EDCA) backoff procedure of the primary link.

In one embodiment, one or more STAs affiliated with the second MLD (e.g., the second STA affiliated with the second MLD) may set an IFS (e.g. AIFS) of the nonprimary link for the backoff procedure as a value which is the same as an IFS used by the primary link.

In one embodiment, one or more STAs affiliated with the second MLD (e.g., the second STA affiliated with the second MLD) may set an initial BC value of the nonprimary link for the backoff procedure as a value that is equal to or less than an initial BC value of the primary link.

In one embodiment, one or more STAs affiliated with the second MLD (e.g., the second STA affiliated with the second MLD) may determine a medium as idle for both the primary link and the nonprimary link.

In one embodiment, one or more STAs affiliated with the second MLD (e.g., the second STA affiliated with the second MLD) may resume or restart the backoff procedure of the nonprimary link at the same time as resuming the backoff procedure for the primary link when a BC value of the nonprimary link is larger than a BC value of the primary link.

In one embodiment, one or more STAs affiliated with the second MLD (e.g., the second STA affiliated with the second MLD) may perform a new backoff procedure of the nonprimary link at the same time as performing a new backoff procedure of the primary link following deferral procedure when a BC value of the backoff procedure of the primary link reaches zero.

In one embodiment, one or more STAs affiliated with the second MLD may (e.g., the second STA affiliated with the second MLD) stop the backoff procedure of the nonprimary link or continue the backoff procedure of the nonprimary link during the data transmission of the primary link when the first STA affiliated with the second MLD initiates data transmission of the primary link and a BC value of the nonprimary link does not reach zero.

In one embodiment, one or more STAs affiliated with the second MLD (e.g., the second STA affiliated with the second MLD) may obtain an EDCA TXOP for the nonprimary link and initiate the data transmission of the nonprimary link with a start time aligned with a start time of the data transmission of the primary link when the second STA affiliated with the second MLD continues the backoff procedure of the nonprimary link.

In one embodiment, one or more STAs affiliated with the second MLD (e.g., the second STA affiliated with the second MLD) may stop the backoff procedure of the nonprimary link at an end of the data transmission of the primary link when not continuing the backoff procedure of the nonprimary link.

In one embodiment, PLNPL medium access mode subfield is specified for the negotiation of one of the PLNPL medium access mode during the multi-link setup between the second MLD (e.g., non-AP MLD) and the first MLD (e.g., NSTR Mobile AP MLD). The values of the PLNPL medium access mode subfield correspond to different PLNPL medium access modes are different. In some embodiments, the primary link and nonprimary link (PLNPL) medium access mode subfield is indicated in a common Info field of a basic multi-link element.

In one embodiment, the PLNPL medium access modes may contain as follows.

1) Mode 1:

Regarding Non-AP MLD:

For a non-AP MLD that is associated with an NSTR mobile AP MLD or a non-AP MLD operating in PLNPL mode (e.g., the aforementioned second MLD), when the non-AP MLD aligns the start times of the PPDUs scheduled for transmission on the primary link and nonprimary link, the STAs in the primary link and the STA in the nonprimary link perform their respective backoff procedures independently and follow the general rules for start time sync PPDUs medium access.

Regarding AP MLD:

For an NSTR mobile AP MLD or AP MLD operating in PLNPL mode (e.g., the aforementioned first MLD), when the AP MLD aligns the start times of the PPDUs scheduled for transmission on the primary link and nonprimary link, the AP in the primary link and the AP in the nonprimary link perform their respective backoff procedures independently and follow the general rules for start time sync PPDUs medium access.

2) Mode 2:

Regarding Non-AP MLD:

For a non-AP MLD that is associated with an NSTR mobile AP MLD or a non-AP MLD operating in PLNPL mode, when the non-AP MLD aligns the start times of the PPDUs scheduled for transmission on the primary link and nonprimary link, the STAs affiliated with the non-AP MLD follow the general rules for start time sync PPDUs medium access, and the STA in the nonprimary link synchronize the initiation of its backoff procedure with the STA in the primary link, which includes: 1) invoking the backoff procedure at the same time as the STA in the primary link; 2) using the same IFS as the STA in the primary link and using the initial BC value that is equal to or less than the initial BC value of the STA in the primary link when invoking the backoff procedure.

Regarding AP MLD:

For a NSTR mobile AP MLD or a AP MLD operating in PLNPL mode, when the AP MLD aligns the start times of the PPDUs scheduled for transmission on the primary link and nonprimary link, the STAs affiliated with the STA MLD follow the general rules for start time sync PPDUs medium access, and the STA in the nonprimary link synchronizes the initiation of its backoff procedure with the STA in the primary link, which includes: 1) invoking the backoff procedure at the same time as the STA in the primary link; 2) using the same IFS as the STA in the primary link and using the initial BC value that is equal to or less than the initial BC value of the STA in the primary link when invoking the backoff procedure.

2) Mode 3:

Regarding Non-AP MLD:

For a non-AP MLD that is associated with an NSTR mobile AP MLD or a non-AP MLD operating in PLNPL mode, when the non-AP MLD aligns the start times of the PPDUs scheduled for transmission on the primary link and nonprimary link, the STAs affiliated with the non-AP MLD follow the general rules for start time sync PPDUs medium access, and the STA in the nonprimary link synchronize the initiation of its backoff procedure with the STA in the primary link, which includes: 1) invoking the backoff procedure at the same time as the STA in the primary link; 2) using the same IFS as the STA in the primary link and using the initial BC value that is equal to or less than the initial BC value of the STA in the primary link when invoking the backoff procedure; 3) the medium is deemed idle as indicated by the physical and virtual CS mechanism not only in the nonprimary link but also in the primary link at the same time. Alternatively, when the non-AP STA in the primary link resumes its backoff procedure following a medium busy condition and the current value of the backoff counter of the non-AP STA in the nonprimary link is larger than the current value of the backoff counter of the non-AP STA in the primary link, the non-AP STA in the nonprimary link should resume or restart its backoff procedure at the same time, and the new or initial BC value of the backoff counter of the non-AP STA in the nonprimary link is set to the value which is the same as or less than the current value of the BC of the non-AP STA in the primary link when it resumes its backoff procedure.

Regarding AP MLD:

For an NSTR mobile AP MLD or an AP MLD operating in PLNPL mode, when the AP MLD aligns the start times of the PPDUs scheduled for transmission on the primary link and nonprimary link, the STAs affiliated with the AP MLD follow the general rules for start time sync PPDUs medium access, and the STA in the nonprimary link synchronizes the initiation of its backoff procedure with the STA in the primary link, which includes: 1) invoking the backoff procedure at the same time as the STA in the primary link; 2) using the same IFS as the STA in the primary link and using the initial BC value that is equal to or less than the initial BC value of the STA in the primary link when invoking the backoff procedure; 3) the medium is deemed idle as indicated by the physical and virtual CS mechanism not only in the nonprimary link but also in the primary link at the same time. Alternatively, when the STA in the primary link resumes its backoff procedure following a medium busy condition and the current value of the backoff counter of the STA in the nonprimary link is larger than the current value of the backoff counter of the STA in the primary link, the STA in the nonprimary link should resume or restart its backoff procedure at the same time, and the new or initial BC value of the backoff counter of the STA in the nonprimary link is set to the value which is the same as or less than the current value of the BC of the STA in the primary link when it resumes its backoff procedure.

FIG. 8 is a schematic diagram of information fields of multi-link element format according to an exemplary embodiment of the present disclosure. Referring to FIG. 8, the PLNPL capabilities subfield contains several subfields that are used to advertise the capabilities for the PLNPL operation. It is contained in the Common Info field of the Basic Multi-Link element as shown in FIG. 8. The information field may include the common info length, the MLD MAC address, the link ID info, the basic service set (BBS) parameters change count, medium synchronization delay information, the enhanced multi-link (EML) capabilities, MLD capabilities, and PLNPL capabilities.

Figure 9:
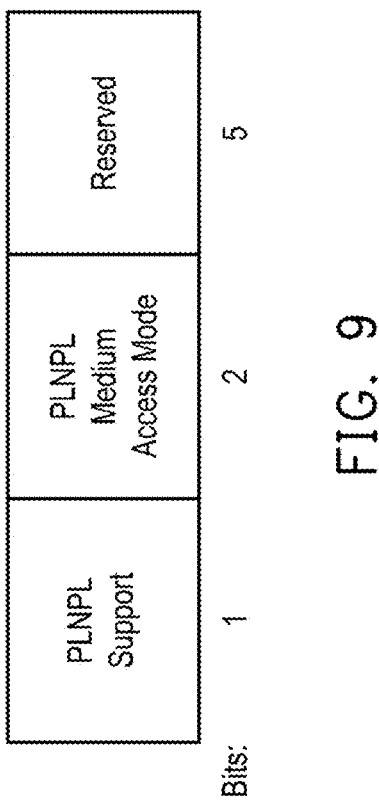
FIG. 9 is a schematic diagram of the primary link and nonprimary link (PLNPL) capability subfield format according to an exemplary embodiment of the present disclosure.

FIG. 9 is a schematic diagram of the primary link and nonprimary link (PLNPL) capability subfield format according to an exemplary embodiment of the present disclosure. Referring to FIG. 9, the format of the PLNPL capabilities subfield is defined and may include PLNPL support, PLNPL medium access mode, and reserved subfield.

The PLNPL support subfield indicates support of the primary link and nonprimary link (PLNPL) operation for an MLD. The PLNPL support subfield is set to 1 if the MLD supports the PLNPL operation. Otherwise, the PLNPL support subfield is set to 0.

The format of the PLNPL medium access mode subfield is defined in table (1) (PLNPL operation mode subfield encoding):

TABLE 1

| PLNPL Medium Access Mode subfield value | Description |
| --- | --- |
| 0 | Mode 1 |
| 1 | Mode 2 |
| 2 | Mode 3 |
| 3 | Reserved |

The above introduces the solutions of the embodiments of the disclosure from the perspective of the execution process on the method side. It can be understood that, in order to realize the above-mentioned functions, the user equipment includes a hardware structure and/or a software module corresponding to each function. Those skilled in the art should easily realize that, in combination with the modules and algorithm steps of the examples described in the embodiments provided herein, the disclosure can be implemented in the form of hardware or a combination of hardware and computer software. Whether a function is executed by hardware or computer software-driven hardware depends on the specific application and design constraints of the technical solution. Professional technicians can use different methods for each specific application to implement the described functions, but such implementation should not be considered beyond the scope of this application.

The embodiments of the disclosure may divide the functional module of the MLD according to the above method example, for example, each functional module may be divided corresponding to each function, or two or more functions may be integrated into one processing module. The above integrated module may be implemented in the form of hardware or software functional module. It should be noted that the division of the modules in the embodiments of the disclosure is schematic, and is only a division of logical functions. In actual implementation, there may be another division manner.

Figure 10:
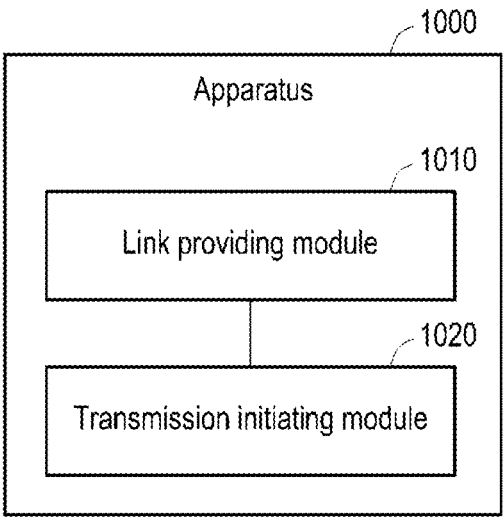
FIG. 10 is a block diagram of a communication apparatus according to an exemplary embodiment of the present disclosure.

FIG. 10 is a block diagram of a communication apparatus 1000 according to an exemplary embodiment of the present disclosure. Referring to FIG. 10, the communication apparatus 1000, which is applied to the aforementioned first MLD or second MLD, may include a link providing module 1010 and a transmission initiating module 1020.

The link providing module is configured to provide a primary link and a nonprimary link. The primary link is connected between a first AP affiliated with a first MLD and a first STA affiliated with a second MLD, and the nonprimary link is connected between a second AP affiliated with the first MLD and a second STA affiliated with the second MLD. The transmission initiating module 1020 is configured to initiate data transmissions via the primary link and the nonprimary link based on synchronization of EDCA operations on the primary link and the nonprimary link.

In one embodiment, the primary link and the nonprimary link are operated on PLNPL mode.

In one embodiment, the primary link and the nonprimary link belong to the NSTR link pair.

In one embodiment, the EDCA operations include backoff procedures, and the transmission initiating module 1020 is further configured to synchronize initiations of the backoff procedures of the primary link and the nonprimary link.

In one embodiment, the transmission initiating module 1020 is further configured to invoke the backoff procedure of the nonprimary link at the same time as invoking the backoff procedure of the primary link.

In one embodiment, the transmission initiating module 1020 is further configured to set an IFS of the nonprimary link for the backoff procedure as a value which is the same as an IFS used by the primary link.

In one embodiment, the transmission initiating module 1020 is further configured to set an initial BC value of the nonprimary link for the backoff procedure as a value that is equal to or less than an initial BC value of the primary link.

In one embodiment, the transmission initiating module 1020 is further configured to determine a medium as idle for the backoff procedure of the nonprimary link when the medium is deemed idle as indicated by physical and virtual carrier sense (CS) mechanism on both the primary link and the nonprimary link when invoking the backoff procedure.

In one embodiment, the transmission initiating module 1020 is further configured to resume or restart the backoff procedure of the nonprimary link at the same time as resuming the backoff procedure for the primary link when a BC value of the nonprimary link is larger than a BC value of the primary link.

In one embodiment, the transmission initiating module 1020 is further configured to perform a new backoff procedure of the nonprimary link at the same time as performing a new backoff procedure of the primary link following deferral procedure when a BC value of the backoff procedure of the primary link reaches zero.

In one embodiment, the transmission initiating module 1020 is further configured to stop the backoff procedure of the nonprimary link or continue the backoff procedure of the nonprimary link during the data transmission of the primary link when initiating data transmission of the primary link and a BC value of the nonprimary link does not reach zero.

In one embodiment, the transmission initiating module 1020 is further configured to align start times of PPDUs scheduled for the transmissions on the primary link and the nonprimary.

In one embodiment, the transmission initiating module 1020 is further configured to obtain an EDCA transmission opportunity (TXOP) for the nonprimary link and initiate the data transmission of the nonprimary link with a start time aligned with a start time of the data transmission of the primary link when continuing the backoff procedure of the nonprimary link.

In one embodiment, the transmission initiating module 1020 is further configured to stop the backoff procedure of the nonprimary link at an end of the data transmission of the primary link when not continuing the backoff procedure of the nonprimary link.

In one embodiment, the transmission initiating module 1020 is further configured to allow the primary link to access a medium at a time of issuance of PHY-TXSTART.request for each primary link based on the EDCA operation on the primary link, and allow the nonprimary link to access a medium at a time of issuance of PHY-TXSTART.request for each of the nonprimary link based on the EDCA operation on the nonprimary link.

In one embodiment, the transmission initiating module 1020 is further configured to initiate the data transmission of the nonprimary link together with the data transmission of the primary link when the medium on the primary link and the nonprimary link is idle, the BC value of the nonprimary link is zero, and the STA or the AP obtains an EDCA TXOP in the primary link, or initiate the data transmission of the nonprimary link when a medium on the nonprimary link is idle and the STA or the AP obtains an EDCA TXOP in the primary link.

In one embodiment, the transmission initiating module 1020 is further configured to not transmit and keep a BC value of the primary link at zero when the BC value of the primary link reaches zero, or not transmit and keep a BC value of the nonprimary link at zero when the BC value of the nonprimary link reaches zero.

In one embodiment, the transmission initiating module 1020 is further configured to perform a new backoff procedure of the primary link in a case that a BC value of the primary link is already zero, or perform a new backoff procedure of the nonprimary link in a case that a BC value of the nonprimary link is already zero.

In one embodiment, PLNPL medium access mode subfield is specified for negotiation of one of PLNPL medium access modes during a multi-link setup between the first MLD and the second MLD, and values of the PLNPL medium access mode subfield correspond to different PLNPL medium access modes are different. In some embodiments, the PLNPL medium access mode subfield is indicated in a common Info field of a basic multi-link element.

In one embodiment, the first MLD is an NSTR mobile AP MLD or an AP MLD in primary link and nonprimary link (PLNPL) mode, and the second MLD is a non-AP MLD associated with the NSTR mobile AP MLD or a non-AP MLD operating in PLNPL mode.

It should be noted that the user equipment described in the embodiments of the disclosure are presented in the form of functional modules. The term "module" used herein should be understood as the widest possible meaning. The object used to implement the functions described by each "module" may be, for example, an integrated circuit ASIC, a single circuit, or a chip, used to execute one or more software or firmware. The program's processor (shared, dedicated, or chipset) and memory, combined logic circuits, and/or other suitable components that provide the functions described above.

Figure 11:
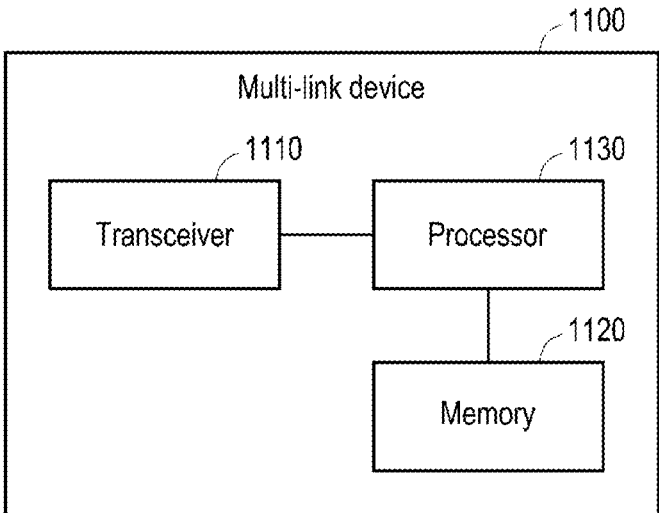
FIG. 11 is a block diagram of a multi-link device according to an exemplary embodiment of the present disclosure.

FIG. 11 is a block diagram of a multi-link device 1100 according to an exemplary embodiment of the present disclosure. Referring to FIG. 11, the multi-link device 1100, which is applied to the aforementioned first MLD or second MLD, may include one or more transceivers 1110, one or more memories 1120, and one or more processors 1030. A program code is stored on the memory 1120 and run on the processor 1130. The program code implements the steps of the communication method described in any one of FIG. 2 and FIG. 7 when being executed by the processor. The transceivers 1110 communicate with other electronic devices over a wireless network (e.g., WLAN) and typically operate according to IEEE standards (e.g., IEEE 802.11ax, IEEE 802.11ay, IEEE 802.11be, etc.). One transceiver 110 may establish one link (e.g., a primary link or a nonprimary link). The multi-link device 1100 may be any type of device that includes, but are not limited to subscriber equipment, wireless transmitter/receiver unit (WTRU), mobile station, an advanced mobile station (AMS), a telephone apparatus, customer premise equipment (CPE), a wireless sensor, a handheld device with wireless communication function, a computing device or other processing devices connected to wireless modems, an in-vehicle device, a wearable device, or the like.

Since the program code stored in the multi-link device 1100 adopts all the technical solutions of all the foregoing embodiments when being executed by the processor 1130, it at least has all the advantageous effects brought by all the technical solutions of all the foregoing embodiments, and no further description is incorporated herein.

Furthermore, an embodiment of the present disclosure further provides a non-transitory computer-readable storage medium having a program code stored on the computer-readable storage medium to cause a computer to perform the communication method described in any one of FIG. 2 and FIG. 7.

Since the program code stored in the computer-readable storage medium adopts all the technical solutions of all the foregoing embodiments when being executed by the processor, it at least has all the advantageous effects brought by all the technical solutions of all the foregoing embodiments, and no further description is incorporated herein.

It should be noted that, for the foregoing method embodiments, for the sake of simple description, they are all described as a series of action combinations. However, those skilled in the art should know that this application is not limited by the described action order. Because according to the disclosure, certain steps may be performed in another order or simultaneously. Secondly, those skilled in the art should also know that the embodiments described in the specification are all exemplary embodiments, and the actions and modules involved are not necessarily required for this application.

In the above embodiments, the description of each embodiment has its own emphasis. For a part that is not described in detail in one embodiment, reference may be made to related descriptions in other embodiments.

In the several embodiments provided in this application, it should be understood that the disclosed device may be implemented in other ways. For example, the device embodiments described above are only schematic. For example, the division of the module is only a logical function division. In actual implementation, there may be another division manner. For example, multiple modules or components may be combined or may Integration into another system, or some features can be ignored or not implemented. In addition, the displayed or discussed mutual coupling or direct coupling or communication connection may be indirect coupling or communication connection through some interfaces, devices or modules, and may be electrical or other forms.

The modules described as separate components may or may not be physically separated, and the components displayed as modules may or may not be physical units, may be located in one place, or may be distributed on multiple network units. Some or all of the modules may be selected according to actual needs to achieve the objective of the solution of this embodiment.

In addition, each functional module in each embodiment of the disclosure may be integrated into one processing module, or each of the modules may exist separately physically, or two or more modules may be integrated into one module. The above integrated module may be implemented in the form of hardware or in the form of software program modules.

When the integrated module is implemented in the form of a software program module and sold or used as an independent product, it may be stored in a computer-readable memory. Based on such an understanding, the technical solution of the disclosure essentially or part that contributes to the existing technology or all or part of the technical solution can be embodied in the form of a software product, which is stored in a memory, several instructions are included to enable a computer device (which may be a personal computer, a server, or a network device, etc.) to perform all or part of the steps of the method described in the embodiments of the disclosure. The foregoing memory includes a flash disk, a read-only memory (ROM), a random access memory (RAM), a mobile hard disk, a magnetic disk, or an optical disk, and other media that can store program codes.

The embodiments of the disclosure further provide a chip. The chip includes a processor, and the processor can call and run a computer program from the memory to implement the method in the embodiment of the disclosure.

Optionally, the chip may further include a memory. The processor may call and run a computer program from the memory to implement the method in the embodiment of the disclosure.

The memory may be a separate device independent of the processor, or may be integrated in the processor.

Optionally, the chip may further include an input interface. The processor can control the input interface to communicate with other devices or chips, and for example, can obtain information or data sent by other devices or chips.

Optionally, the chip may further include an output interface. The processor can control the output interface to communicate with other devices or chips, and for example, can output information or data to other devices or chips.

Optionally, the chip can be applied to the network device in the embodiment of the disclosure, and the chip can implement the corresponding process implemented by the network device in various methods in the embodiment of the disclosure. For conciseness, related details are omitted.

Optionally, the chip can be applied to the mobile terminal/terminal device in the embodiment of the disclosure, and the chip can implement the corresponding process implemented by the mobile terminal/terminal device in various methods in the embodiment of the disclosure. For conciseness, related details are omitted.

It should be understood that the chip mentioned in the embodiment of the disclosure may also be referred to as a system-level chip, a system chip, a chip system, or a system-on-chip, etc.

It should be understood that the memory described above is exemplary but not restrictive. For example, the memory in the embodiment of the disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SL-DRAM) and Direct Rambus RAM (DR RAM), etc. That is to say, the memory in the embodiments of the disclosure is intended to include, but is not limited to, these and any other suitable types of memory.

The embodiments of the disclosure further provide a computer program product, including computer program instructions.

Optionally, the computer program product may be applied to the communication device in the embodiment of the disclosure, and the computer program instructions enable the computer to execute the corresponding process implemented by the communication device in various methods of the embodiment of the disclosure. For conciseness, related details are omitted.

The embodiment of the disclosure further provides a computer program.

Optionally, the computer program can be applied to the communication device in the embodiment of the disclosure. When the computer program is run on the computer, the computer can execute the corresponding process implemented by the communication device in various methods of the embodiment of the disclosure. For conciseness, related details are omitted.

In summary, in the communication method, the communication apparatus, the multi-link device, and the storage medium, data transmissions are initiated via the primary link and the nonprimary link of the NSTR link pair based on synchronization of EDCA operations on both links. Therefore, the waiting time for simultaneous transmission may be reduced, and the transmission opportunity may not be lost.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication method, comprising:
providing, by a plurality of access points (APs) affiliated with a first multi-link device (MLD), a primary link and a nonprimary link, the first MLD being an access point (AP) MLD, the primary link being the link between a first AP affiliated with the first MLD and a first station (STA) affiliated with a second MLD, and the nonprimary link being the link between a second AP affiliated with the first MLD and a second STA affiliated with the second MLD; and
initiating, by the plurality of APs affiliated with the first MLD, data transmissions via the primary link and the nonprimary link based on synchronization of enhanced distributed channel access (EDCA) operations on the primary link and the nonprimary link;

wherein initiating data transmission via the primary link and the nonprimary link based on synchronization of EDCA operations on the primary link and the nonprimary link comprises:
allowing, by the first AP affiliated with the first MLD, the primary link to access a medium thereof at a time of issuance of PHY-TXSTART.request for the primary link based on the EDCA operation on the primary link; and
allowing, by the second AP affiliated with the first MLD, the nonprimary link to access a medium thereof at the time of issuance of PHY-TXSTART.request for the nonprimary link based on the EDCA operation on the nonprimary links.

2. The method according to claim 1, further comprising:
initiating, by the first AP affiliated with the first MLD, the data transmission on the primary link when a medium on the primary link is idle and the first STA AP affiliated with the first MLD obtains an EDCA TXOP in the primary link; or
initiating, by the second AP affiliated with the first MLD, the data transmission of the nonprimary link together with the data transmission of the primary link when the medium on the primary link and nonprimary link is idle, a BC of the nonprimary link is already zero, and the first AP affiliated with the first MLD obtains an EDCA TXOP in the primary link.

3. The method according to claim 1, further comprising:
not transmitting, by the first AP affiliated with the first MLD, and keeping, by the first AP affiliated with the first MLD, a BC value of the primary link at zero when the BC value of the primary link reaches zero; or
not transmitting, by the second AP affiliated with the first MLD, and keeping, by the second AP affiliated with the first MLD, a BC value of the nonprimary link at zero when the BC value of the nonprimary link reaches zero.

4. The method according to claim 1, further comprising:
performing, by the first AP affiliated with the first MLD, a new backoff procedure of the primary link in a case that a BC value of the primary link has already reached zero; or
performing, by the second AP affiliated with the first MLD, a new backoff procedure of the nonprimary link in a case that a BC value of the nonprimary link has already reached zero.

5. The method according to claim 1, wherein initiating transmissions via the primary link and the nonprimary link comprises:
aligning, by the plurality of APs affiliated with the first MLD, start times of physical layer convergence procedure protocol data unit (PPDUs) scheduled for the transmissions on the primary link and the nonprimary link.

6. The method according to claim 1, wherein primary link and nonprimary link (PLNPL) medium access mode subfield is specified for negotiation of one of PLNPL medium access modes during a multi-link setup between the first MLD and the second MLD, values of the PLNPL medium access mode subfield corresponding to different PLNPL medium access modes being different.

7. The method according to claim 6, wherein the primary link and nonprimary link (PLNPL) medium access mode subfield is indicated in a common Info field of a basic multi-link element.

8. The method according to claim 1, wherein the primary link and the nonprimary link are nonsimultaneous transmit and receive (NSTR) link pair.

9. The method according to claim 1, wherein the primary link and the nonprimary link are operated on PLNPL mode.

10. The method according to claim 1, wherein the first MLD is a NSTR mobile AP MLD or an AP MLD operating in the PLNPL mode, and the second MLD is a non-AP MLD associated with the NSTR mobile AP MLD or a non-AP MLD operating in PLNPL mode.

11. A multi-link device (MLD), the MLD being a first MLD and comprising:

a memory configured to store instructions;

a processor coupled with the memory, the processor configured to execute the instructions to cause a plurality of access points (APs) affiliated with the first MLD to perform:

providing a primary link and a nonprimary link, the first MLD being an access point (AP) MLD, the primary link being the link between a first AP affiliated with the first MLD and a first station (STA) affiliated with a second MLD, and the nonprimary link being the link between a second AP affiliated with the first MLD and a second STA affiliated with the second MLD; and initiating data transmissions via the primary link and the nonprimary link based on synchronization of enhanced distributed channel access (EDCA) operations on the primary link and the nonprimary link;

wherein the processor is configured to execute the instructions to cause the first AP affiliated with the first MLD to perform:

allowing the primary link to access a medium thereof at a time of issuance of PHY-TXSTART.request for the primary link based on the EDCA operation on the primary link; and the processor is configured to execute the instructions to cause the second AP affiliated with the first MLD to perform:

allowing the nonprimary link to access a medium thereof at the time of issuance of PHY-TXSTART.request for the nonprimary link based on the EDCA operation on the nonprimary links.

12. The MLD according to claim 11, wherein the processor is configured to execute the instructions to cause the first AP affiliated with the first MLD to further perform:

initiating the data transmission on the primary link when a medium on the primary link is idle and the first AP affiliated with the first MLD obtains an EDCA TXOP in the primary link; or the processor is configured to execute the instructions to cause the second AP affiliated with the first MLD to further perform:

initiating the data transmission of the nonprimary link together with the data transmission of the primary link when the medium on the primary link and nonprimary link is idle, a BC of the nonprimary link is already zero, and the first AP affiliated with the first MLD obtains an EDCA TXOP in the primary link.

13. The MLD according to claim 11, wherein the processor is configured to execute the instructions to cause the first AP affiliated with the first MLD to further perform:

not transmitting, and keeping a BC value of the primary link at zero when the BC value of the primary link reaches zero; or the processor is configured to execute the instructions to cause the second AP affiliated with the first MLD to further perform:

not transmitting, and keeping a BC value of the nonprimary link at zero when the BC value of the nonprimary link reaches zero.

14. The MLD according to claim 11, wherein the processor is configured to execute the instructions to cause the first AP affiliated with the first MLD to further perform:

performing a new backoff procedure of the primary link in a case that a BC value of the primary link has already reached zero; or the processor is configured to execute the instructions to cause the second AP affiliated with the first MLD to further perform:

performing a new backoff procedure of the nonprimary link in a case that a BC value of the nonprimary link has already reached zero.

15. The MLD according to claim 11, wherein the processor is configured to execute the instructions to cause the plurality of APs affiliated with the first MLD to perform:

aligning start times of physical layer convergence procedure protocol data unit (PPDUs) scheduled for the transmissions on the primary link and the nonprimary link.

16. The MLD according to claim 11, wherein primary link and nonprimary link (PLNPL) medium access mode subfield is specified for negotiation of one of PLNPL medium access modes during a multi-link setup between the first MLD and the second MLD, values of the PLNPL medium access mode subfield corresponding to different PLNPL medium access modes being different.

17. The MLD according to claim 16, wherein the primary link and nonprimary link (PLNPL) medium access mode subfield is indicated in a common Info field of a basic multi-link element.

18. The MLD according to claim 11, wherein the primary link and the nonprimary link are nonsimultaneous transmit and receive (NSTR) link pair.

19. The MLD according to claim 11, wherein the primary link and the nonprimary link are operated on PLNPL mode.

20. The MLD according to claim 11, wherein the first MLD is a NSTR mobile AP MLD or an AP MLD operating in the PLNPL mode, and the second MLD is a non-AP MLD associated with the NSTR mobile AP MLD or a non-AP MLD operating in PLNPL mode.

* * * * *